March 11, 1947.                G. K. NEWELL                2,417,211
                              CONTROL APPARATUS
                           Filed Aug. 19, 1944          4 Sheets-Sheet 3
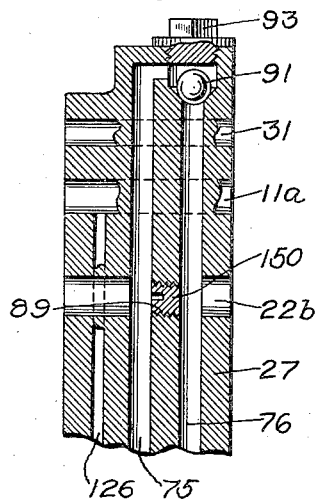
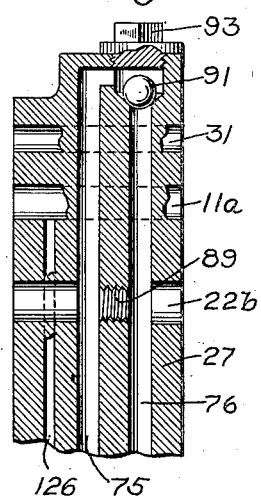
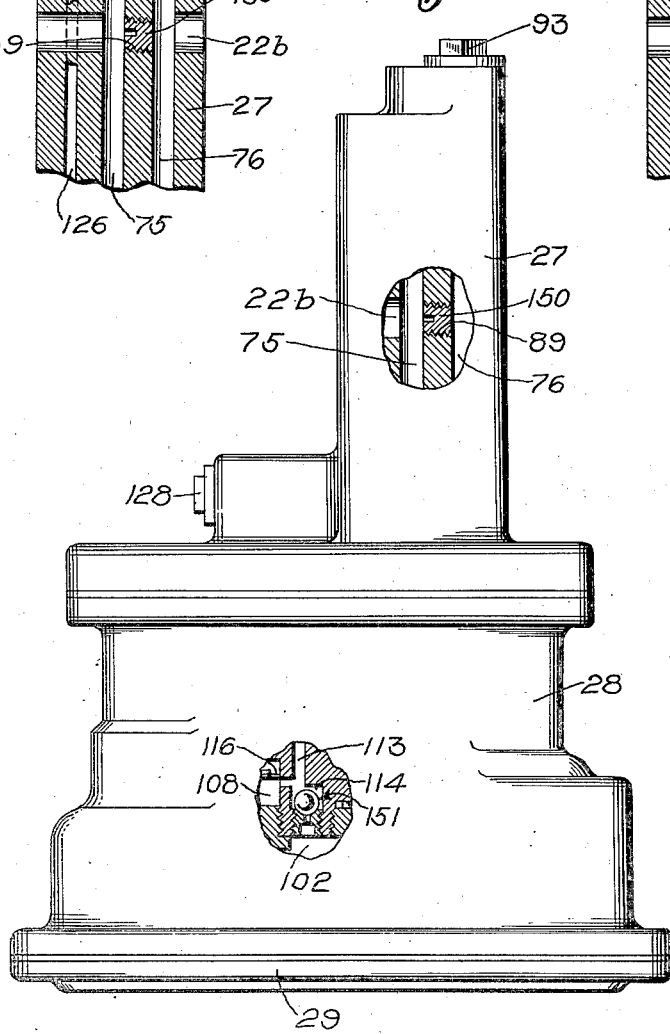
INVENTOR.
George K. Newell
BY
ATTORNEY March 11, 1947.　　　G. K. NEWELL　　　2,417,211
CONTROL APPARATUS
Filed Aug. 19, 1944　　　4 Sheets-Sheet 4
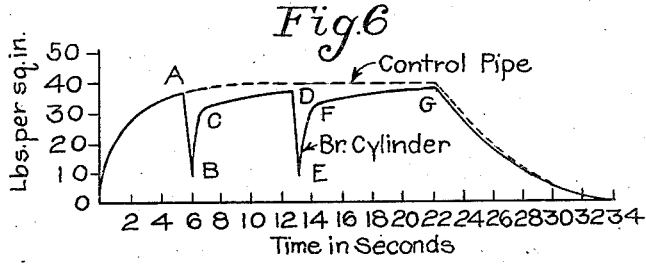
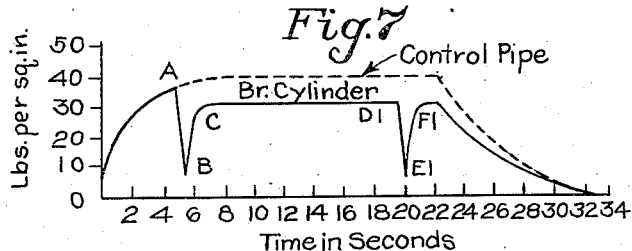
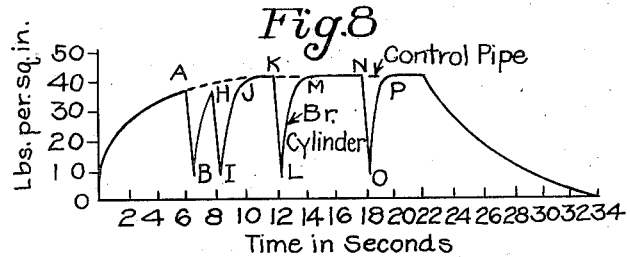
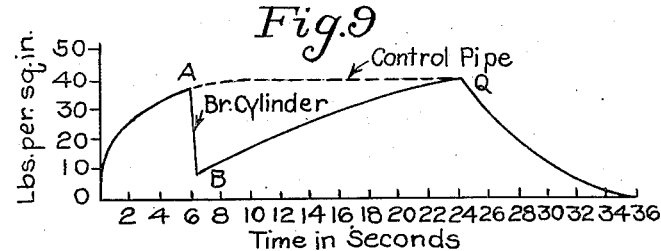
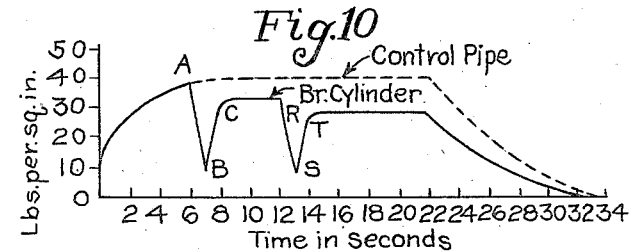
INVENTOR.
George K. Newell
BY
ATTORNEY

UNITED STATES PATENT OFFICE 2,417,211

CONTROL APPARATUS

George K. Newell, near Pitcairn, Pa., assignor to The Westinghouse Air Brake Company, Wilmerding, Pa., a corporation of Pennsylvania Application August 19, 1944, Serial No. 550,163

30 Claims. (Cl. 303—21)

This invention relates to control apparatus and has particular relation to apparatus for controlling the pressure of the fluid in the brake cylinders of fluid pressure brake systems on vehicles, such as railway cars and trains, in a manner to prevent sliding of the wheels.

The railroads have long sought a serviceable apparatus for automatically controlling the degree of a brake application on the wheels of railway cars and trains in a manner to prevent locking of the wheels and the consequent sliding thereof. Sliding of railway car wheels is undesirable, partly because of the decrease in retardation effect on the car or train exertable through locked and sliding wheels compared to that exertable through rolling wheels, and partly because sliding develops flat spots on the wheels, thereby necessitating the repair or replacement of the wheels and involving a consequent delay in operating schedules.

Various devices of mechanical or electrical nature have been proposed and employed for the purpose of detecting the slipping condition of vehicle wheels and effective directly or indirectly to control the degree of application of the brakes, as determined by the degree of fluid pressure in the brake cylinders, in a manner to prevent sliding of the wheels.

My present invention is concerned primarily with the control apparatus that controls the brake cylinder pressure in response to the indication of a wheel-slip condition by a wheel-slip detecting device. For purposes of my present invention the particular type of wheel-slip detecting device is immaterial but I prefer to employ and have disclosed herein a wheel-slip detecting device of the so-called fly-wheel type which is described in detail and claimed in the copending application, Serial No. 533,284, of which Joseph C. McCune and I are joint applicants, filed April 29, 1944 and assigned to the assignee of the present application.

The term "slip," "slipping condition," and other variants as employed herein refer to the rotation of a vehicle wheel at a speed different from that corresponding to vehicle speed at a given instant. While in a slipping condition, the wheel may rotate at a speed greater or less than a speed corresponding to vehicle speed at a given instant depending upon whether the slipping condition is induced by excessive propulsion torque or excessive braking torque, respectively. In the present application it will be understood that the slipping condition of a vehicle wheel referred to is that induced by excessive braking torque.

It is well known and has been demonstrated that the slipping condition of a vehicle wheel may be reliably indicated on the basis of an abnormal rate of deceleration of the vehicle wheel. Under normal braking and adhesion conditions, a railway car wheel cannot greatly exceed a rate of rotative deceleration of five miles per hour per second without danger of exceeding the limit of adhesion between the wheel and the rail. If a car wheel rotatively decelerates at a rate exceeding ten miles per hour per second, it is therefore a positive indication that the wheel is slipping.

The so-called fly-wheel type of wheel-slip detector, above referred to, is operative to detect the abnormal rate of deceleration of the vehicle wheel indicative of the slipping condition, its construction being such that the fly-wheel tends to rotatively lead the vehicle wheel, to which it is operatively connected and by which it is driven, in response to the deceleration of the wheel.

Various types of control apparatus have previously been proposed and employed which function in response to the operation of a wheel-slip detecting device in a manner to rapidly reduce the pressure in the brake cylinder associated with the slipping wheel and, thereafter, restore the pressure in the brake cylinder to effect the application of the brakes in a manner to minimize the possibility of a recurrence of wheel slipping. For example, it has been proposed to provide suitable control apparatus operative in response to the operation of the wheel-slip detecting device to insure the reduction of the brake cylinder pressure to below a certain low value before permitting resupply of fluid under pressure to the brake cylinder, thereby insuring the release of the brakes and the return of the vehicle wheel to vehicle speed before a substantial degree of pressure is restored in the brake cylinders. It has also been proposed to limit the degree to which the pressure in the brake cylinder may be restored following a wheel-slip condition to a value lower than that obtaining in the brake cylinder at the time the wheel-slip condition occurs. It has also been proposed to provide control apparatus functioning repeatedly with successive wheel-slip cycles during any given brake application to limit the degree to which the brake cylinder pressure may be restored to different values each of which is lower than that preceding each wheel-slip condition.

It has also been proposed to provide reapplication control apparatus for restricting the rate at which the pressure in the brake cylinder may be restored after the reduction in brake cylinder pressure has been effected in response to operation of the wheel-slip detecting device. It has also been proposed to provide control apparatus which functions to permit restoration of the pressure in the brake cylinder, after a wheel-slip condition occurs, first at a relatively fast rate and then at a relatively slow rate.

Climatic conditions in the various geographical areas may dictate different types of reapplication control. Thus, in the southern states of the United States where good rail conditions (high wheel-to-rail adhesion) are the rule and bad rail conditions (low wheel-to-rail adhesion) the exception throughout the year, it may be possible to provide control apparatus which enables the restoration of the pressure in the brake cylinder, after a wheel-slip condition occurs, at a relatively fast rate back to a pressure obtaining at the time the wheel-slip condition occurs, on the assumption that the bad rail condition was only a momentary or temporary condition. On the other hand, in the northern states of the United States where bad rail conditions may be the rule for a number of months in the year, it may be desirable to control the restoration of the pressure in the brake cylinder in a manner to restrict the rate at which the pressure in the brake cylinder is restored or to limit the degree to which the pressure in the brake cylinder is restored to a value less than that in the brake cylinder preceding the wheel-slip, or to permit a restoration of the pressure in the brake cylinder first at a fast rate and then at a relatively slow rate back to a pressure corresponding to that in the brake cylinder preceding the wheel-slip condition.

It is an object of my present invention, therefore, to provide a single control valve mechanism adapted to provide any one of a plurality of different types of reapplication control for the brakes of railway cars and trains.

More specifically, it is an object of my invention to provide a single control valve mechanism which may be adjusted or conditioned to effect any desired type of reapplication control for the pressure in the brake cylinders of railway cars incident to the reapplication of the brakes after a wheel-slip condition occurs.

Heretofore known types of reapplication control apparatus for limiting the pressure in the brake cylinder following a wheel-slip cycle to a value less than that existing therein prior to the wheel-slip cycle have been based on the assumption that the pressure in the brake cylinder at the instant a wheel-slip condition occurs is the same as the pressure ultimately established in the control pipe. However, this is not necessarily the case because wheel slip may occur while brake cylinder pressure is being built up to that ultimately established in the control pipe and before such ultimate pressure is attained when the application of the brakes is first initiated. It is possible, therefore, in the case of prior known reapplication control apparatus of this type wherein the pressure restored in the brake cylinder following a wheel-slip condition is determined by the ultimate pressure established in the control pipe rather than the brake cylinder pressure at the instant that the slipping condition first occurs, that the pressure restored in the brake cylinder following the initial wheel-slip condition may actually be higher than that which will initiate wheel-slip, thus tending to cause repeated wheel-slip cycles.

It is accordingly a further object of my present invention to provide reapplication control apparatus so constructed and arranged as to limit the pressure restored in a brake cylinder following a wheel-slip condition to a value which is always a certain substantially uniform amount lower than that existing in the brake cylinder at the instant the wheel-slip begins. By thus limiting the reapplication pressure restored in the brake cylinder following a wheel-slip cycle with reference to the actual pressure in the brake cylinder at the instant the wheel-slip begins rather than the ultimately established control pipe pressure, as in prior known reapplication control apparatus, the number of recurrent slipping cycles is reduced and the likelihood of repeated wheel-slip cycles is lessened.

It is a further object of my invention to provide a vehicle brake system embodying control apparatus of the type set forth in the foregoing objects.

The above objects, and other objects of my invention which will be made apparent hereinafter, are attained by means of apparatus subsequently to be described and shown in the accompanying drawings, wherein Fig. 1 is a simplified diagrammatic view of a fluid pressure brake equipment for a railway car truck, having my invention embodied therein, Fig. 2 is an enlarged diagrammatic sectional view of the vent valve mechanism shown in Fig. 1.

Figs. 3 and 4 are fragmental views of the vent valve mechanism shown in Fig. 2, severa'ly illustrating the manner in which the vent valve mechanism may be conditioned to provide different reapplication control characteristics at different times.

Fig. 5 is an outline view, partially in section, showing the manner in which the valve mechanism of Fig. 2 may be further conditioned to provide a still different reapplication control characteristic.

Fig. 6 is a hypothetical curve showing the manner in which brake cylinder pressure is controlled by the vent valve mechanism of Fig. 2 in relation to control pipe pressure.

Fig. 7 is a hypothetical curve showing the manner in which brake cylinder pressure is controlled by the vent valve mechanism, when conditioned as shown in Fig. 3, in relation to control pipe pressure.

Fig. 8 is a hypothetical curve showing the manner in which brake cylinder pressure is controlled by the vent valve mechanism when conditioned as shown in Fig. 4 in relation to control pipe pressure.

Figure 1:
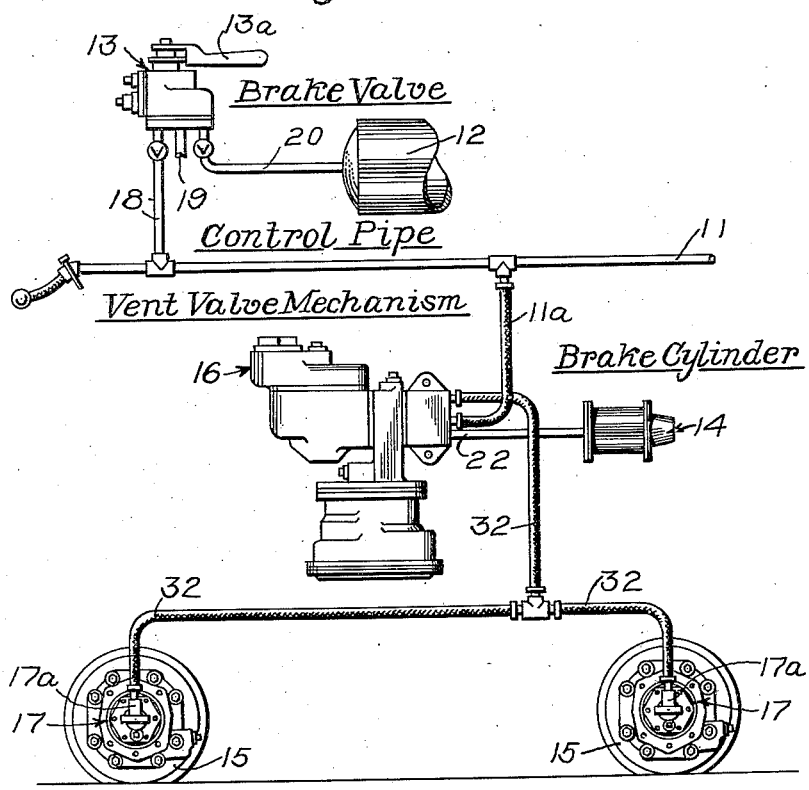

Fig. 9 is a hypothetical curve showing the manner in which brake cylinder pressure is controlled by the vent valve mechanism of Fig. 2, when adjusted in a certain manner hereinafter to be described, in relation to control pipe pressure, and Fig. 10 is a hypothetical curve showing the manner in which brake cylinder pressure is controlled by the vent valve mechanism, when conditioned as shown in Fig. 5, in relation to control pipe pressure.

Description

The control apparatus which I have disclosed herein may be employed in connection with any conventional type of fluid pressure brake apparatus, such as the well-known Westinghouse HSC equipment. Such an equipment is described in Instruction Pamphlet No. 5064, Sup. 13, published by The Westinghouse Air Brake Company, the assignee of this application. For simplicity, I have shown a simple straight-air type of fluid pressure brake equipment in the drawings but it should be understood that such type of fluid pressure brake control equipment is merely illustrative of any suitable type of equipment.

Referring to Fig. 1, the simple straight-air type of fluid pressure brake apparatus shown may comprise a train pipe 11 hereinafter referred to as the control pipe, a reservoir 12 normally charged to a certain pressure as by a fluid compressor not shown, a brake valve 13 of the well known self-lapping type for controlling the pressure in the control pipe 11, a brake cylinder 14 for effecting application of the brakes on the wheels 15 of the associated car truck through intervening brake rigging and levers not shown, and a so-called vent valve mechanism 16 interposed between the control pipe 11 and the brake cylinder 14 for establishing communication between the control pipe and the brake cylinder and also for controlling the pressure in the brake cylinder independently of variation of the pressure in the control pipe, in response to operation of wheel-slip detecting devices 17 associated with the vehicle wheels, for the purpose of preventing sliding of the wheels.

Considering the parts of the equipment in greater detail, the brake valve 13 comprises an operating handle 13a which is effective to operate the rotary operating shaft of a self-lapping valve mechanism contained in the casing. In the normal or brake release position of the brake valve handle 13a, the control pipe 11 is vented to atmosphere through a branch pipe 18 and an exhaust port and pipe 19 at the brake valve. As the brake valve handle 13a is shifted out of its brake release position into its application zone, the self-lapping valve mechanism is operated to close the exhaust communication for the control pipe and establish a supply communication from the reservoir 12 and the connecting pipe 20 to the branch pipe 17 and control pipe 11 to cause fluid under pressure to be supplied to the control pipe to charge it to a pressure determined by the position of the brake valve handle in the application zone. Thus, the farther the brake valve handle is shifted out of its brake release position, the higher is the pressure established in the control pipe 11. If for any reason the pressure in the control pipe 11 tends to reduce, the self-lapping valve mechanism of the brake valve operates automatically to supply fluid under pressure to the control pipe to maintain a pressure therein corresponding to the position of the brake valve handle.

Fluid under pressure is supplied from the control pipe 11 to the brake cylinder 14 under the control of the vent valve mechanism 16 in a manner to be presently fully described. For the present it is sufficient to state that a branch pipe 11a of the control pipe leads to the vent valve mechanism and a pipe 22 leads from the vent valve mechanism to the brake cylinder, the vent valve mechanism establishing communication between the pipes 11a and 22 under normal conditions. It will thus be seen that the brake cylinder will be charged to a pressure corresponding to that in the control pipe under normal conditions so that the brakes will be applied on the wheels 15 to a degree corresponding to the pressure of the fluid established in the brake cylinder 14.

The control pipe 11 is carried on the body of the car whereas the brake cylinder 14 and the vent valve mechanism 16 are carried on the car truck. The branch pipe 11a connecting the control pipe 11 to the vent valve mechanism is accordingly of flexible construction because of the relative movement between the car truck and the car body.

When brake valve handle 13a is restored to its brake release position, the pressure in the control pipe and correspondingly in the brake cylinder 14 is reduced to atmospheric pressure, thereby effecting the release of the brakes on the wheels.

Figure 2:
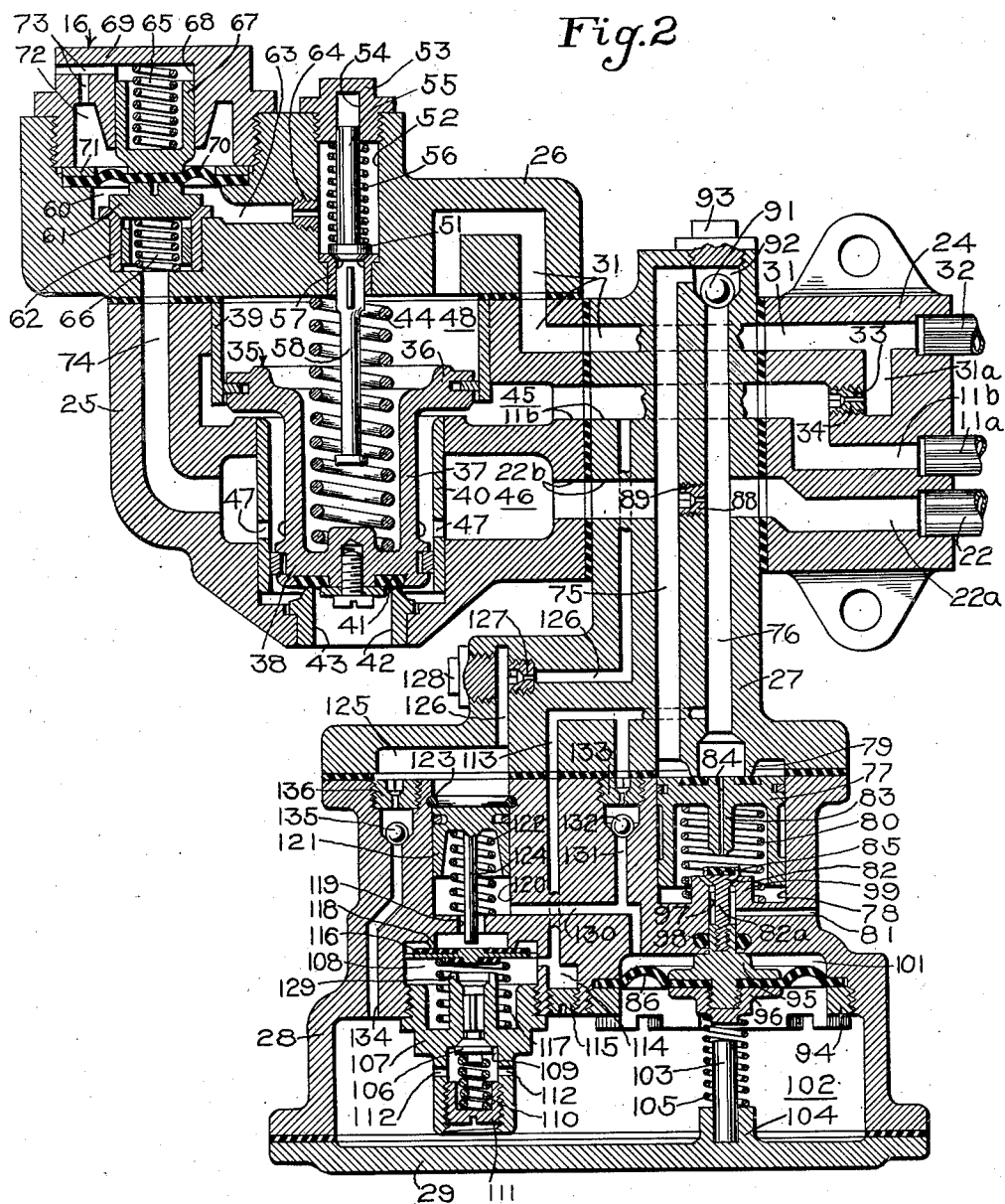

Referring to Fig. 2, the vent valve mechanism 16 embodying my present invention comprises a sectionalized casing including a mounting and pipe bracket section 24, a vent valve section 25, a cover section 26 attached to the vent valve section 25, a filling-piece section 27 having two opposite faces to which the sections 24 and 25 are respectively secured in sealed relation as by screws or bolts not shown, a reapplication valve section 28 attached in sealed relation to the bottom face of the filling piece section 27 as by screws or bolts not shown, and a cover plate 29 for the section 28 secured in sealed relation thereto as by screws or bolts not shown. Sections 27, 28 and 29 may be installed as a unit between the vent valve section 25 and the pipe bracket section 24 and likewise removed as a unit. These three casing sections taken collectively may, therefore, be referred to hereinafter, particularly in the appended claims, as the unit casing section.

Formed in the pipe bracket section 24 are two passages 11b and 22a to which the pipes 11a and 22 are respectively connected. The section 24 also has a passage 31 to which a pipe 32 is connected.

As will be seen in Fig. 1, the pipe 32 has two branches, one of which leads to the wheel-slip detecting device 17 associated with one wheel unit, and the other of which leads to the wheel-slip detecting device associated with the other wheel unit. For simplicity only one wheel 15 of each wheel unit is shown in Fig. 1, but it will be understood that the term "wheel unit" refers to a pair of wheels fixed at opposite ends of a connecting axle. In view of the fact that there is relative motion between the spring-supported parts of the truck carrying the vent valve mechanism 16 and brake cylinder 14 and the unsprung portion of the truck carrying the wheel-slip detecting devices 17, the pipe 32 is of flexible construction.

The pipe bracket section 24 is also provided with a branch 31a of the passage 31, which communicates with the passage 11b through a threaded bore 33. A choke fitting 34 having an orifice of selected flow area is screwed into the threaded bore 33 by access through the opening of the passage 11b at the left-hand face of the pipe bracket section 24.

The vent valve casing section 25 contains a differential piston valve 35 comprising a relatively large annular piston 36 having a tubular stem 37 on which a smaller piston 38 is formed at the closed end of the stem. The piston 36 operates in a bushing 39 secured in the casing and the piston 38 operates in a bushing 40 secured in the casing.

Attached to the outer face of the closed end of the stem 37 is an annular gasket 41 which cooperates with an annular rib seat formed on the end of a bushing 42 secured in the casing and providing a large vent port 43. A coil spring 44 interposed between the inner face of the closed end of the stem 37 and the cover section 26 yieldingly urges the differential piston valve to a position in which the gasket 41 seats on the bushing 42.

In its normal position just described, the differential piston valve 35 establishes communication between a chamber 45 and a chamber 46. The inner face of the large annular piston 36 is open to the chamber 45 and the chamber 45 communicates through the interior of the bushing 37 and a plurality of ports 47 in the bushing 40 with the chamber 46 through which the bushing 40 extends.

The chamber 45 is connected to the passage 11b in the pipe bracket section 24 through connected sections of the passage 11b in the casing sections 25 and 27.

The chamber 46 is connected through a passage 22b in the section 25 to a corresponding passage 22b in the filling piece section 27. The passage 22b is connected to the passage 22a in the pipe bracket section 24 and thus to the brake cylinder 14 in the manner to be hereinafter described.

Formed within the bushing 39 above the outer face of the annular piston 36 is a chamber 48. The chamber 48 is connected to the passage 31 in the pipe bracket section 24 through corresponding connected sections of the passage 31 in the cover section 26, the vent valve section 25, and the filling-piece section 27.

Associated with the differential piston valve 35 and carried in the section 26 is a poppet valve 51. The poppet valve 51 is disposed in a bore or chamber 52, the open end of which is closed by a screw plug 53 having a bore or recess 54 for receiving a loose-fitting guide stem 55 on which the valve 51 is formed. A coil spring 56 is interposed between the upper face of the valve 51 and the inner face of the screw plug 53 and yieldingly urges the valve into seated relation on a corresponding valve seat formed on the end of a bushing 57 secured in the casing section 26.

Extending from the poppet valve 51 on the opposite side of guide stem 55 is an operating stem 58 having a fluted portion adjacent the valve which is guided within the bushing 57. The operating stem 58 of the poppet valve 51 extends downwardly through the chamber 48 into the interior of the piston stem 37 of the annular piston 36 within the coil spring 44 in such a manner as to be engaged by a boss formed on the inside face of the closed end of the stem 37 when the differential piston valve 35 is shifted upwardly as hereinafter described. In the uppermost position of the differential piston valve 35 determined by engagement with the seating face formed on the cover section 26 the poppet valve 51 is unseated a desired amount to establish a venting communication from the chamber 48 to the chamber 52.

Also carried by the cover section 26 within a chamber 60 is a valve 61 of the poppet type which cooperates with a valve seat formed on a seat bushing 62 fixed in the casing section 26. Chamber 60 communicates through a passage 63 containing a choke fitting 64 with the bore or chamber 52.

The valve 61 is normally yieldingly urged into seated relation on the valve seat bushing 62 by a coil spring 65 in opposition to the force of a spring 66 tending to unseat the valve. The force of the spring 65 is transmitted through a cup-shaped follower 67 guided in a bore 68 formed in a cap screw 69 screwed into a suitable threaded opening in the casing section 26, the follower 67 engaging the upper face of an imperforate diaphragm 70 which is secured along the periphery thereof in the casing section 26 by the clamping action of the cap screw 69. A washer 71 is interposed between the cap screw 69 and the diaphragm to prevent injury to the diaphragm. The diaphragm 70 thus forms a flexible wall for the chamber 60 in interposed relation between the follower 67 and the valve 61. A chamber 72 formed in the cap screw 69 above the diaphragm 70 is constantly open to atmosphere through an exhaust port and passage 73. The passage 73 also forms an exhaust communication for the interior of the bore 68 to prevent dash-pot action of the follower 67.

A passage 74 connects the chamber 46 to the inner seated area of the valve 61. When fluid under pressure is supplied from the control pipe 11 through the branch pipe 11a and passage 11b to the chambers 45 and 46 incidental to a supply of fluid under pressure to the brake cylinder, such fluid pressure is active through the passage 74 on the inner seated area of the valve 61 and causes unseating of the valve. With the valve 61 unseated, the fluid pressure in the chamber 46 is active within the chamber 60 on the face of the diaphragm 70 to overcome the force of the spring 65 so as to permit the spring 66 to maintain the valve 61 unseated. When the pressure in the chamber 60 reduces below a certain value, such as eighteen pounds per square inch, in the manner hereinafter to be described, the spring 65 is effective to exert a force sufficient to restore the valve 61 to seated position.

The filling-piece section 27 contains two parallel extending passages 75 and 76, the passage 75 being connected to the chamber 46 in the vent valve section 25 by the passage 22b and the passage 76 being connected to the passage 22a in the pipe bracket section 24.

A valve piston 77 operating in a bore 78 in the casing section 28 controls communication between the passages 75 and 76. To this end the valve piston 77 is normally urged into seated relation on an annular rib seat 79, formed on the filling piece section 27 at the extremity of the passage 76, by a coil spring 80, the outer seated area of the valve piston being connected to the passage 75.

The interior of the bore 78 is normally open to atmosphere through an exhaust port 81 past a valve 82 of the poppet type and the valve piston 77 is provided on the interior thereof with a coaxially extending cylindrical extension 83 arranged to engage the valve 82. A choke port 84 is formed in the valve piston, one end of the port 84 terminating at the outer face of the valve piston within the inner seated area thereof and the other end terminating at the extremity of the extension 83. A gasket 85 secured in the face of the poppet valve 82 is engaged by the end of the extension 83 in a manner to close the end of the choke port 84 when the valve piston 77 is shifted downwardly from its raised position, in which it is shown, in response to the force of the fluid pressure supplied from the passage 75 and acting on the outer seated area of the valve piston.

The downward movement of the valve piston 77 is limited by engagement of the skirt thereof with the base of the bore 78 to prevent the seating of the poppet valve 82 in response to the fluid pressure force acting on the upper face of the valve piston 77, it being intended that the poppet valve 82 be seated to close off the exhaust communication through the port 81 only under certain conditions in response to the relation of the fluid pressure forces acting on opposite sides of a diaphragm 86 in the manner hereinafter to be described.

With the valve piston 77 urged downwardly by the force of the fluid pressure in the passage 75 and the end of the choke port 84 closed by seating engagement of the extension 83 on the gasket 85 of the poppet valve 82, a differential force is thus maintained on the valve piston 77 as long as the poppet valve 82 is unseated, so as to maintain the valve piston unseated and thereby establish communication between the passages 75 and 76 so as to permit a rapid supply of fluid under pressure to the brake cylinder 14 in response to the charging of the control pipe 11.

Communication between the passages 75 and 76 is also provided through a choke-fitting 88 that is screwed into a threaded bore 89 connecting the passages 75 and 76. Access to the bore 89 for insertion of the choke-fitting 88 therein is attained through the opening of the passage 22b in the casing section 27. The orifice in the choke-fitting 88 is such as to permit the supply of fluid under pressure to the brake cylinder only at a restricted rate for a reason and under circumstances hereinafter to be explained.

A check valve 91, shown as of the ball type, is also provided in the casing section 27 and is so disposed and arranged as to prevent the flow of fluid under pressure from the passage 75 to the passage 76 but to permit a reverse flow of fluid under pressure from the passage 76 to the passage 75 at a rapid rate for the purpose of reducing the pressure in the brake cylinder 14. The ball check valve 91 is installed in the casing section 27 by direct insertion into a chamber 92 in which it is contained, a screw plug 93 being provided for closing the open end of the chamber 92 after the ball check valve is inserted.

The diaphragm 86 is secured in the casing section 28 around the periphery thereof by a screw type clamping ring 94. Followers 95 and 96 are secured to opposite sides of the central portion of the diaphragm as by a screw-threaded connection through a central opening in the diaphragm. The follower 95 has a cylindrical portion which is guided in a cylindrical bore 97, a grommet ring 98 of suitable material such as rubber being provided in an annular groove in the casing section 28 for providing a fluid-tight seal between the casing and the follower. The stem 82a of the poppet valve 82 extends coaxially through the bore 97 and is fixed to the follower 95 as by a screw-threaded connection. The exhaust port 81 connects the bore 97 to atmosphere. The bore 97 opens into the chamber 78 back of the valve piston 77, past the unseated poppet valve 82. An annular valve seat 99 formed on the casing section 28 surrounding the bore 97 provides a seat for the poppet valve 82.

The diaphragm 86 is open at its upper face to a chamber 101 and at its lower face to a volume or control chamber 102, the open end of which is closed by the cover section 29. Downward movement of the diaphragm 86 is limited by engagement of the follower 96 with a stop pin 103 secured as by a press fit in a recess formed in an inwardly extending boss 104 on the inner face of end cover 29. A coil spring 105 concentrically surrounding the stop 103 and interposed between the end of the boss 104 and the follower 96 yieldingly urges the diaphragm 96 upwardly to a position in which the poppet valve 82 is normally unseated. The spring 105 is a relatively light spring and is provided merely for the purpose of insuring the restoration of the poppet valve 82 to its unseated position in opposition to the friction of the grommet ring 98 on the cylindrical portion of the follower 95.

Chamber 102 is charged simultaneously with the brake cylinder 14, whenever fluid under pressure is supplied to the brake cylinder, under the control of a so-called charging valve 106. The charging valve 106 is a valve of the poppet type having a fluted stem guide in a suitable bore provided in a screw-fitting 107 that is, in turn, screwed into the open end of a chamber 108 in the casing section 28 opening downwardly toward the chamber 102.

The screw-fitting 107 is provided with a tubular extension having a bore 109 in which the valve 106 is received; and a coil spring 110 interposed between the valve 106 and an adjusting set-screw 111 screwed into the outer threaded end of the bore 109 yieldingly urges the valve 106 to a seated position on a valve seat formed on the fitting 107. A plurality of ports 112 are provided in the cylindrical extension of the fitting 107 to provide constant communication between the bore 109 and the chamber 102.

The bore in which the fluted stem of the valve 106 is guided is constantly open to the chamber 108 in the casing section 28 and the chamber 108 is connected by a passage 113 to the passage 76 in the filling-piece section 27.

It will thus be seen that with brake cylinder pressure existing in the passage 76, fluid at a corresponding pressure is supplied past the charging valve 106 to the chamber 102. The maximum pressure that may be established in the chamber 102 is limited to a value less than that established in the brake cylinder by an amount determined by the loading force of the spring 110.

For reasons which will be hereinafter explained, the loading spring 110 of the charging valve 106 is a relatively strong spring and the loading force exerted thereby on the valve 106 may be so adjusted by the adjusting screw 111 as to prevent unseating of the valve 106 in response to any pressure supplied to the brake cylinder, depending upon the brake reapplication control characteristic desired. However, for purposes of an analysis of the operation of the valve mechanism as shown in Fig. 2 it will be assumed that the setting of the adjusting screw 111 is such that the spring 110 exerts such a force on the valve 106 as to provide a minimum differential of five pounds per square inch between the pressure established in the chamber 102 and that established in the brake cylinder 14. As will be explained hereinafter, charging of chamber 102 may be terminated before the minimum differential is attained, in response to operation of a cut-off valve 116.

Communication between the passage 113 and the chamber 102 may, under certain circumstances, be desired, as hereinafter explained in connection with Fig. 5. For this purpose, a bore or passage 114 is provided in the casing section 28 in a manner to connect the passage 113 to the chamber 102. For purposes of the valve mechanism when conditioned as shown in Fig. 2, this passage 114 is closed by a plug 115 screwed into the threaded end thereof that opens into the volume chamber 102.

The cut-off valve 116 is of the disk type and is guided in the chamber 108 in such a manner as to be normally urged, by a coil spring 117, to an upper position in which it is seated on an annular rib seat 118 formed on the casing section 28. The inner seated area of the valve 116 is open through a port 119 to a bore 120 formed in the casing section 28. Operating in the bore 120 is a piston 121 that is urged upwardly by a coil spring 122 to an upper position determined by the engagement of the piston 121 with a retainer snap ring 123 engaged in a suitable annular groove provided in the wall of the bore 120. The piston 121 is provided with a centrally disposed stem 124 that extends downwardly through the port 119 and terminates adjacent the upper face of the valve 116.

The bore 119 in the casing section 28 is open to a cavity or chamber 125 formed in the lower contact face of the filling-piece section 27. Chamber 125 is connected by a passage 126 with passage 11b in the filling-piece section 27. A choke-fitting 127 is screwed into a tapped bore in a manner to provide a restricted orifice in the passage 126. The choke-fitting 127 is inserted through a suitable tapped opening in the wall of the casing section 27 and a screw plug 128 is provided for closing the tapped opening after the choke fitting is inserted.

It will thus be seen that when fluid under pressure is supplied through the passage 11a to the brake cylinder in response to the charging of the control pipe 11, fluid under pressure is correspondingly supplied through the passage 126 at a restricted rate to the chamber 125 wherein it exerts a force urging the piston 121 downwardly. At the same time, however, the pressure of the fluid simultaneously built up in the chamber 108 at a faster rate through the unrestricted passage 113 exerts a force on the lower face of valve 106 effective to maintain the valve seated on the rib seat 118 in opposition to the force exerted by the piston 121. The inner seated area of valve 116 is, moreover, larger than the area of the face of piston 121 so that the piston is ineffective to unseat the valve 116 even after the fluid pressure in chamber 125 is built up to that in chamber 108, unless the pressure in chamber 108 is reduced as presently explained.

When the pressure in the brake cylinder is reduced, however, by operation of the differential piston valve 35 of the vent valve section 25 in the manner hereinafter to be described, the pressure in chamber 108 is correspondingly reduced and thus the force of the fluid pressure exerted on the face of the piston 121 in the chamber 125 becomes effective to shift the valve 116 downwardly in unseated relation to the rib seat 118 and into seated relation on a rib seat 129 formed on the cylindrical extension of the screw-fitting 107 surrounding the opening of the bore in which the fluted stem of the charging valve 106 is guided. Once the valve 116 is seated on the rib seat 129, therefore, the pressure of fluid resupplied to the chamber 108 aids the force exerted by piston 121 in maintaining the valve 116 seated on the rib seat 129.

With the disk valve 116 unseated from the rib seat 118, chamber 108 is connected through the port 119, the bore 120, and a passage 130 to the chamber 101 at the upper side of the diaphragm 86.

A pressure release communication is provided between the passage 130 and the passage 113 by a passage 131 containing a ball check valve 132 and a choke-fitting 133. The ball check valve 132 is contained in a bore opening at the contact face of casing section 28 and cooperates with a valve seat formed in the casing section 28 in such a manner as to prevent the flow of fluid under pressure from the passage 113 to the passage 130 while permitting the reverse flow of fluid under pressure therepast. The choke-fitting 133 is screwed into the outer threaded end of the bore containing the check valve 132.

A pressure release communication is provided for chamber 102 by a passage 134 connecting the chamber 102 and the chamber 125, a ball check valve 135 and a choke-fitting 136 being interposed in the passage 134. The ball check valve 135 is contained in a bore constituting an enlarged portion of the passage 134 opening at the face of casing section 28 and cooperates with a valve seat formed on the casing section 28 in a manner to prevent the supply of fluid under pressure from the chamber 125 to the chamber 102 but to permit the reverse flow of fluid under pressure therepast. The choke-fitting 136 is screwed into the outer threaded end of the bore containing the check valve 135. It will thus be seen that the fluid in the chamber 102 may be released therefrom in correspondence with the reduction of the pressure in control pipe 11.

It is deemed unnecessary to describe in detail the structure and operation of the wheel-slip detecting devices 17, because reference may be had to the copending application, Serial No. 533,284 previously mentioned. For purposes of the present application, it is sufficient to state that the wheel-slip detecting devices 17 are embodied in a suitable casing attached to the end of the journal box or casing associated with the axle of the car wheels 15 in a manner to be driven by rotation of the axle and having a pilot valve 17a which is operated to rapidly vent fluid under pressure from the pipe 32 only when the car wheels decelerate at a slipping rate, that is, at a rate exceeding that corresponding to retardation of the car or train at ten miles per hour per second.

*Operation*

Let it be assumed that the car or train having the brake control equipment disclosed in Fig. 1 is traveling along the road under power and that the operator desires to effect an application of the brakes. To do so, he first shuts off the propulsion power and then operates the brake valve handle 13a to effect an application of the brakes in the manner previously described.

Upon the charging of the control pipe 11, fluid under pressure is accordingly supplied to the brake cylinder 14 from the control pipe 11 by way of the branch pipe 11a, passage 11b, chamber 45, ports 47, chamber 46, passage 22b, passage 75, past the valve piston 77 which is unseated automatically as previously described, passage 76, passage 22a, and pipe 22 to the brake cylinder 14. A certain amount of fluid may flow from the passage 75 to the passage 76 through the choke-fitting 88. However, in view of the rapid rate of flow of fluid past the valve piston 77, the amount of flow through the choke-fitting 88 is relatively small under the circumstances.

With fluid under pressure being thus supplied through the chamber 45, the pressure of the fluid in the chamber 45 is active on the piston 36 in a direction tending to overcome the force of the spring 44 and shift the differential piston valve 35 upwardly. However, due to the simultaneous supply of fluid under pressure through the choke 34, branch passage 31a, and passage 31 to the chamber 48 above the piston 36 at a sufficiently rapid rate, insufficient differential force is exerted on piston valve to shift it out of its lower seated position shown in Fig. 2.

Assuming a pressure to be established in the brake cylinder sufficient to overcome the force of the loading spring 65 opposing the unseating of the valve 61 in the cover section 26, the valve 61 will be unseated and fluid pressure corresponding to that in the chamber 46 will accordingly be active on the diaphragm 70 to maintain the follower 67 in a raised position, thus permitting the valve 61 to remain unseated. The pressure of the fluid thus transmitted from the chamber 60 through the passage 63 and choke 64 to the bore 52, and the force of the spring 56 are effective to maintain the poppet valve 51 seated in opposition to the force of the fluid pressure in the chamber 48 active on the inner seated area of the valve 51.

With fluid under pressure being supplied through the passage 76 to the brake cylinder 14, fluid under pressure is simultaneously supplied through the passage 113, past the charging valve 106 to the chamber 102. At the same time, fluid under pressure is supplied from the passage 11a through the passage 126 to the chamber 125. However, due to the restricted rate of build-up of the pressure in the chamber 125 effected by the choke 127, the disk valve 116 is maintained in seated position on the rib seat 118 in the manner previously described by reason of the predominating force of the fluid pressure in the chamber 108 active on the disk valve 116. The pressure of the fluid supplied to the chamber 102 is limited to a maximum value which is a selected amount lower than that established in the brake cylinder 14, dependent upon the degree of adjustment of the loading spring 110 associated with the charging valve 106. For purposes of present description, it will be assumed that the pressure established in the chamber 102 will be five pounds per square inch less than that established in the brake cylinder 14.

It will be understood that due to the engagement of the follower 95, carried by the diaphragm 86, with the casing section 28, the force of the fluid pressure in the chamber 102 is ineffective to raise the poppet valve 82 beyond the position in which it is shown. However, the force of the fluid pressure in the chamber 102 acting on the diaphragm 86 is effective to exert a force sufficient to prevent downward movement of the poppet valve 82 in response to the force of the fluid pressure acting on the outer face of the valve piston 77. It will be understood that once the valve piston 77 is shifted downwardly so that the opening of the choke port 84 therein is sealed on the gasket 85 of the poppet valve 82, it is maintained in such position by reason of the differential of fluid pressures acting thereon.

If the degree of pressure established in the brake cylinder 14 is such, with relation to the adhesion between the wheels and the rails, that no slipping of the wheels occurs, no further operation of the vent valve mechanism 16 occurs except in response to the reduction of the pressure in the control pipe 11.

If, however, one of the wheel units shown in Fig. 1 begins to slip in response to the pressure established in the brake cylinder 14 while fluid under pressure is being supplied thereto and while the pressure in the brake cylinder is less than that ultimately established in the control pipe 11, operation of the vent valve mechanism 16 is effected in the manner now to be described.

Operation of the pilot valve 17a of the affected wheel-slip detecting device 17 in response to the slipping of the corresponding wheel unit causes fluid under pressure to be rapidly vented to atmosphere from chamber 48 above the piston 36 of the piston valve 35 through passage 31 and pipe 32. A certain amount of fluid under pressure flows from passage 11b through the choke 34 to the pipe 32. However, the rate of such flow is relatively low compared to the rate at which fluid under pressure is vented from the pipe 32 by operation of the pilot valve 17a. Moreover, the self-lapping valve mechanism of the brake valve 13 operates automatically in a manner to maintain the pressure in the control pipe 11 to a value corresponding to the position of the brake valve handle notwithstanding the reduction of pressure which tends to be effected by flow of fluid under pressure through the choke 34.

A differential fluid pressure is accordingly created on the piston 36 of the differential piston valve 35 by reason of the higher pressure of the fluid in the chamber 45 with respect to the pressure of fluid in the chamber 48 and, consequently, the piston valve 35 is shifted upwardly in opposition to the resisting force of spring 44 into seated engagement on the contact face of the cover section 26.

In this position of the piston valve 35, the piston 38 is above the ports 47 and thus communication between chambers 45 and 46 is cut off while, at the same time, communication is established between the chamber 46 and the exhaust port 43. Fluid under pressure is thus rapidly vented to atmosphere from the brake cylinder 14 past the ball check valve 91 and unseated valve piston 77, through chamber 46, and the port 43 to effect a rapid reduction in the degree of application of the brakes associated with the slipping wheel unit.

Under the reduction of the pressure in the passage 76 in correspondence with the reduction of the brake cylinder pressure, the force of the fluid pressure in the chamber 125 which corresponds to the uniformly maintained pressure in the control pipe 11 is effective to urge the piston 121 downwardly to shift the disk valve 116 out of engagement with the rib seat 118 and into engagement with the rib seat 129, in which position it cuts off the further supply of fluid under pressure past the charging valve 106 to the chamber 102, thereby preventing a further rise of pressure therein notwithstanding a build-up of pressure in the control pipe 11 to a further degree in correspondence with the position of the brake valve handle.

With the differential piston valve 35 in its uppermost position, the poppet valve 51 is unseated and, by reason of the fact that the valve 61 is concurrently unseated, the chamber 48 is thereby connected to the chamber 46 so that the pressure of the fluid in the chamber 48 is thereafter reduced concurrently and simultaneously with the pressure in the brake cylinder at a corresponding rate independently of a termination of further venting from the chamber 48 by reason of closure of the pilot valve 17a of the wheel-slip detecting device associated with the slipping wheel.

The pressure in the brake cylinder accordingly continues to reduce at a rapid rate until such time as the pressure active in the chamber 60 on the lower side of the diaphragm 70 reduces below a value of substantially eighteen pounds per square inch when the coil spring 65 becomes effective to shift the valve 61 to a seated position. With the valve 61 seated, further reduction of the pressure in the chamber 48 through the exhaust port 43 is terminated.

In the meantime, due to the rapid reduction of the pressure in the brake cylinder and the fact that the reduction is continued to a relatively low value such as eighteen pounds per square inch, the slipping wheel will have ceased to decelerate and have accelerated substantially back to a speed corresponding to vehicle speed without actually attaining a locked wheel state and sliding. In such case, therefore, the pilot valve 17a of the associated wheel-slip detecting device 17 will have reclosed. By reason of the supply of fluid under pressure from the passage 11b through the choke 34 and passage 31 to the chamber 48 at this time, the pressure in the chamber 46 will be promptly built up to a value such that spring 44 becomes effective to shift the piston valve 35 downwardly to a seated position on the seat bushing 42. Actually, the response of the piston valve 35 is very rapid once the valve 61 is reseated. However, the response of the piston valve 35 is not sufficiently rapid to prevent some degree of further reduction of brake cylinder pressure after the valve 61 is seated. Accordingly the pressure in the brake cylinder may reduce further to a value, such as five pounds per square inch, before the piston valve 35 is actually reseated on the seat bushing 42 to terminate further exhaust of fluid under pressure from the brake cylinder and to reestablish the supply communication between the control pipe and the brake cylinder.

Due to the pressure maintaining feature of the self-lapping brake valve 13, the resupply of fluid under pressure from the control pipe 11 to the brake cylinder 14 is ineffective to effect a reduction of the pressure in the control pipe 11 and, consequently, such pressure remains active in the chamber 125 to exert a force through the piston 121 to maintain the disk valve 116 seated on the annular rib seat 129. Accordingly, upon the build-up of fluid under pressure in the passage 76 corresponding to the build-up of pressure in the brake cylinder 14, fluid under pressure is again supplied through the passage 113 to the chamber 108. In this case, however, fluid under pressure is supplied from the chamber 108 through the port 119, bore 120, and passage 130 to the chamber 101 at the upper side of the diaphragm 86. When the fluid pressure attained in the chamber 101 predominates slightly over the pressure existing in the chamber 102, which it will be remembered is the equivalent of the pressure in the brake cylinder at the time the wheel-slip condition occurs, the diaphragm 86 is flexed downwardly to effect seating of the poppet valve 82.

In its seated position, the poppet valve 82 closes the exhaust communication from the bore 78 back of the valve piston 77 through the exhaust port 81 and, at the same time, is disengaged from the extension 83 on the valve piston 77. The choke port 84 is of such a size as to permit a sufficiently rapid flow of fluid under pressure from the outer face of the valve piston 77 to the back face of the valve piston within the bore 78 to render the spring 80 promptly effective to reseat the valve piston 77 on the rib seat 79, thereby preventing the further supply of fluid under pressure therepast to the brake cylinder at a rapid rate.

After the valve piston 77 is seated, fluid under pressure continues to be supplied at a restricted rate to the brake cylinder through the choke 88, the ultimate pressure attainable in the brake cylinder corresponding to that established in the control pipe 11.

The operation of the vent valve mechanism 16, thus far described, may be reviewed briefly by reference to Fig. 6. Fig. 6 shows hypothetical curves of pressure in the control pipe and in the brake cylinder during a slow-down brake application maintained for a certain length of time, approximately twenty-two seconds, and then released by operation of the brake valve, the dotted or broken line indicating the pressure in the control pipe 11 and the solid line representing the pressure in the brake cylinder. It will be seen that up until the time the initial wheel-slip condition occurred, indicated at point A, brake cylinder pressure and control pipe pressure were rising substantially simultaneously. Beginning at point A, the pressure in the brake cylinder was reduced to a low value of approximately five pounds per square inch at the point B, while the pressure in control pipe 11 continued to rise to the selected pressure corresponding to the position of the brake valve handle. Upon termination of brake cylinder venting by operation of the vent valve section 25 at the point B, the pressure in the brake cylinder was built up at a rapid rate to the point C corresponding to the instant the valve piston 77 was reseated. This point it will be observed is a certain amount, approximately five pounds per square inch, below the pressure in the brake cylinder at point A at the instant the wheel-slip condition occurs. The restricted rate of build-up of pressure in the brake cylinder is indicated by the section of the brake cylinder curve subsequent to the point C and terminating at the point D, such portion of the curve representing the rate of supply of fluid under pressure to the brake cylinder through the choke 88.

For purposes of further explanation of the operation of the vent valve mechanism 16, let it now be assumed that when the pressure in the brake cylinder is built up to a value corresponding to that existing at the point A a second wheel-slip cycle occurs. Accordingly the brake cylinder pressure curve drops sharply from the point D to a point E corresponding in value to the point B and then rises rapidly again to the point F, corresponding in value to that at the point C, after which the pressure in the brake cylinder rises at a relatively slow rate to the point G. It will be understood that the valve piston 77 is reseated at the point F to cut-off the rapid rate of build-up of pressure in the brake cylinder at a pressure corresponding to that at point C of the first wheel-slip cycle. This point of cut-off of rapid build-up of pressure in the brake cylinder will always be the same with the vent valve mechanism conditioned and adjusted as shown in Fig. 2, regardless of the number of slipping cycles, by reason of the fact that the pressure of the fluid trapped in the chamber 102 remains constant and determines the point at which the valve piston 77 will be reseated.

In Fig. 6, it is assumed that at the time the pressure in the brake cylinder rises to the value at point G, the engineer operates the brake valve 13 to effect a complete release of the brakes. As shown the pressure in the brake cylinder thus reduces rapidly from the point G, in substantial correspondence with the reduction of the pressure in the control pipe 11, to atmospheric pressure.

In such case, it will be apparent that the differential piston valve 35 of the vent valve section 25 will remain in the position in which it is shown in Fig. 2 by reason of the fact that the pressure in the chamber 48 reduces at a slower rate through the choke 34 than the pressure in the chamber 45 and the connected brake cylinder 14. The pressure in the brake cylinder 14 reduces at a rapid rate in correspondence with the reduction of the pressure in the control pipe 11 by reason of the back flow of fluid under pressure from the passage 76 past the ball check valve 91 to the passage 75 at a rapid rate.

When the pressure in the chamber 46 of the vent valve section 25 reduces below eighteen pounds per square inch in response to the reduction of control pipe pressure, the loading spring 65 again becomes effective to reseat the valve 61.

Upon the reduction of the pressure in the brake cylinder in response to the reduction of control pipe pressure, fluid under pressure is correspondingly vented from the chamber 102 and the chamber 101 by back flow past the ball check valves 135 and 132, respectively. With the disk valve 116 maintained in seated relation on the annular rib seat 129 until such time as the spring 117 is effective to restore the disk valve 116 into seated relation on the annular valve seat 118 as the pressure in the chambers 108 and 125 reduces, fluid under presure may also be released at first from the chamber 101 by way of the passage 130, bore 120, port 119, chamber 108, and passage 113. After the disk valve 116 is seated on the annular rib seat 118, however, further reduction of the pressure in the chamber 101, passage 130, and bore 120 is effected past the check valve 132.

The pressure in the chamber 101 may thus reduce at a somewhat more rapid rate than the pressure in the chamber 102, especially in view of the restriction offered by the choke 127 to the reduction of the pressure in the chamber 102.

Accordingly, due to the differential of the fluid pressure in the chamber 102 over that in the chamber 101 on the diaphragm 86, and due also to the force of the spring 105, the diaphragm 86 is urged upwardly to the position shown in which the poppet valve 82 is unseated. Fluid under pressure is accordingly vented from the bore 78 at the back of the valve piston 77 past the unseated poppet valve 82 and through the exhaust port 81. A sufficient differential fluid pressure is thus created on the valve piston, by reason of the higher fluid pressure acting on the outer face of the valve piston with respect to that in the bore 78 at the back of the valve piston, to cause the valve piston 77 to be momentarily unseated to provide additional communication between the passages 76 and 75 through which fluid under pressure may be released from the brake cylinder in parallel relation to the ball check valve 91. When the pressure in the passages 75 and 76 is sufficiently reduced, the spring 80 will restore the valve piston 77 upwardly into seated relation on the annular rib seat 79.

It will thus be apparent that upon the complete venting of fluid under pressure from the control pipe 11 and the corresponding complete release of the brakes, the vent valve mechanism 16 is again conditioned as shown in Fig. 2.

Should the engineer of the train desire to effect an application of the brakes for the purpose of bringing the train to a complete stop instead of merely slowing the train down, as has previously been assumed, he may set the brake valve handle 13a in a fixed position and allow it to remain therein until the train has been brought to a complete stop or he may effect a graduated release of the brakes as the train approaches a complete stop. If, while employing valve mechanism conditioned as shown in Fig. 2, the brake valve handle 13a is allowed to remain in a fixed position until the train comes to a complete stop, recurrence of wheel-slipping is more likely to occur than if a graduated release of the brakes is effected. Such is not always the case, however, for with the valve mechanism conditioned as shown in Fig. 5 as later to be described, the likelihood of recurrent wheel slip cycles when the brake valve handle is set in a fixed position is eliminated.

Assuming that the brake valve handle 13a is allowed to remain in a fixed position, once an application of the brakes is initiated, it will be understood that after the train comes to a complete stop and there is no more likelihood of the wheel-slip cycles occurring, the pressure in the brake cylinder will be built up to the equivalent of that established in the control pipe.

If the engineer effects a graduated release of the brakes as the train approaches a stop, the ultimate limit of brake cylinder pressure will be correspondingly reduced with the reduction of the pressure in the control pipe. Should the pressure in the control pipe be reduced below that established in chamber 102 of the vent valve mechanism 16, then the pressure in the chamber 102 and that in the control pipe 11 will be equalized, or substantially so, through passage 134 past check valve 135. In such case, the resupply of fluid under pressure to chamber 101 above the diaphragm 86 will be ineffective to flex the diaphragm downwardly and to close the valve 82 following the occurrence of a slipping condition of the wheels. Valve piston 77 will thus not be reseated and the resupply of fluid under pressure to the brake cylinder will be continued at a rapid rate up to the maximum determined by the pressure in the control pipe. The slow buildback phase of resupply of fluid under pressure to the brake cylinder will thus not occur. Due to this fact wheel-slipping is more likely to occur than if a graduated release of the brakes is effected. Such is not always the case, however, for with the valve mechanism conditioned as shown in Fig. 5 as later to be described, the likelihood of recurrent wheel slip cycles when the brake valve handle is set in a fixed position is eliminated.

Assuming that the brake valve handle 13a is allowed to remain in a fixed position, once an application of the brakes is initiated, it will be understood that after the train comes to a complete stop and there is no more likelihood of the wheel-slip cycles occurring, the pressure in the brake cylinder will be built up to the equivalent of that established in the control pipe.

If the engineer effects a graduated release of the brakes as the train approaches a stop, the ultimate limit of brake cylinder pressure will be correspondingly reduced with the reduction of the pressure in the control pipe. Should the pressure in the control pipe be reduced below that established in chamber 102 of the vent valve mechanism 16, then the pressure in the chamber 102 and that in the control pipe 11 will be equalized, or substantial so, through passage 134 past check valve 135. In such case, the resupply of fluid under pressure to chamber 101 above the diaphragm 86 will be ineffective to flex the diaphragm downwardly and to close the valve 82 following the occurrence of a slipping condition of the wheels. Valve piston 77 will thus not be reseated and the resupply of fluid under pressure to the brake cylinder will be continued at a rapid rate up to the maximum determined by the pressure in the control pipe. The slow buildback phase of resupply of fluid under pressure to the brake cylinder will thus not occur. Due to the fact that the rapid rate of resupply of fluid under pressure to the brake cylinder is terminated, in such case, at a pressure in the brake cylinder lower than that which originally induced the slipping condition, there is, however, no necessity for the slow build-back phase.

*Figs. 3 and 7*

If it is desired to obtain a reapplication control of brake cylinder pressure, in which restoration of the pressure in the brake cylinder at a restricted rate is eliminated in all instances following the rapid rate of build-up to a value lower than that existing in the brake cylinder preceding the wheel-slip condition, the condition of the vent valve mechanism 16 may be altered in the manner shown in Fig. 3. Such alteration of the condition of the vent valve mechanism 16 consists merely in the substitution of a screw plug 150 for the choke-fitting 88 in the filling-piece section 27. This alteration may be effected in a very simple and expeditious manner, without disturbing pipe connections to the pipe mounting bracket section 24, merely by removing the vent valve section 25, unscrewing the choke-fitting 88, screwing in plug 150, and then replacing the vent valve section 25.

With the vent valve mechanism 16 conditioned as shown in Fig. 3, the type of reapplication control shown in Fig. 7 is attained. It should be unnecessary to analyze the complete operation of the vent valve mechanism for this condition thereof since it should be apparent that the substitution of the plug 150 for the choke-fitting 88 eliminates the relatively slow continued build-up of pressure in the brake cylinder following the termination of the fast rate of brake cylinder pressure build-up by reseating of valve piston 77.

Assuming identical operation of the brake valve in the case of Fig. 7 as compared to Fig. 6, it will be seen that the operation of the vent valve mechanism 16 is identical from the point A, where the wheel-slip condition begins, through the point B where the reduction of brake cylinder pressure is terminated and back to the point C where fast build-up of pressure in the brake cylinder is terminated. Thereafter, with the vent valve mechanism 16 conditioned as shown in Fig. 3, no further build-up of the pressure in the brake cylinder occurs. The curve of brake cylinder pressure in Fig. 7 is thus a uniform value after the point C to the point D1, at which a second wheel-slip condition is assumed to occur.

In view of the fact that the pressure trapped in the chamber 102 remains constant, assuming no reduction of pressure in control pipe 11, it will be seen that following the second wheel-slip cycle represented by the portion of the brake cylinder pressure curve traced between the points D1, E1, and F1, fast build-up or restoration of pressure in the brake cylinder is terminated at the point F1 where the brake cylinder pressure corresponds in value to that at the point C.

In other words, with the vent valve mechanism 16 conditioned as shown in Fig. 3, and assuming that the brake valve handle is set in a fixed position to maintain a constant control pipe pressure, the pressure to which the brake cylinder pressure may be restored following each wheel-slip condition occurring during that application will be limited to a uniform value below that existing in the brake cylinder at the instant the first wheel-slip cycle during that application occurred.

If, however, in effecting an application of the brakes to bring the train to a complete stop, the engineer effects a graduated release of the brakes toward the end of the stop, the pressure in the chamber 102 will be reduced in response to the reduction of control pipe pressure, assuming that control pipe pressure is reduced below that established in the chamber 102. Should a wheel-slip condition occur after the pressure in the control pipe 11 has been reduced, the reduction of the pressure in the chamber 101 past the ball check valve 132 and through the choke 133 incidental to the venting of pressure in the brake cylinder by operation of the vent valve section 25 will result in a higher pressure in the chamber 102 on the lower side of the flexible diaphragm 86 and the diaphragm 86 will be urged upwardly to the position shown in Fig. 2 in which the poppet valve 82 is unseated to vent the back of the valve piston 77. The valve piston 77 will thus be promptly actuated downwardly until the extension 83 on the valve piston engages the gasket 85 in the poppet valve 82 to close the choke port 84 in the valve piston. The valve piston 77 will thus remain unseated during the time that fluid under pressure is being vented from the brake cylinder by operation of the vent valve section 25. Notwithstanding reduction of brake cylinder pressure, the pressure acting on the outer face of the valve piston 77 in the passages 75 and 76 will remain sufficiently high to overcome the spring 80 and maintain valve piston 77 seated in position on the poppet valve 82 to prevent flow of fluid under pressure past valve 82 and to atmosphere through port 81.

When fluid under pressure is again supplied to the brake cylinder following the relief of the wheel-slip condition, valve piston 77 will remain in its unseated or open position because fluid pressure exists in the passages 75 and 76 sufficient to overcome the force of the spring 80, poppet valve 82 being held unseated. On the assumption that the pressure restorable in the brake cylinder and corresponding to the reduced pressure established in control pipe 11 cannot rise to a value equal to that remaining in chamber 102, the diaphragm 86 will not be fluxed downwardly in response to the supply of fluid under pressure to chamber 101. Poppet valve 82 will thus remain unseated and fluid under pressure will continue to be supplied at a rapid rate past valve piston 77 to the brake cylinder until the pressure established therein corresponds to that existing in the control pipe. The operation of the vent valve mechanism 16 when conditioned as shown in Fig. 3 being otherwise similar to that when conditioned as shown in Fig. 2, no further description of the operation when conditioned as shown in Fig. 3 is deemed necessary.

*Figs. 4 and 8*

Under certain circumstances, it may be desirable to provide a reapplication control characteristic for the vent valve mechanism 16 which causes it to function in a manner to rapidly restore the pressure in the brake cylinder following release of a wheel-slip condition to a value equivalent to that corresponding to that established in the control pipe 11. In such case the vent valve mechanism 16 is conditioned as shown in Fig. 4. Such conditioning is effected merely by removing the choke fitting 88 from the filling-piece section 27.

With the choke-fitting 88 so removed from the filling-piece section 27 of the vent valve mechanism 16, operation of the vent valve mechanism 16 will be identical to that previously described for the vent valve mechanism conditioned as shown in Fig. 2 upon initiation of an application of the brakes and during that portion of the wheel-slip cycle terminating with the reseating of the valve piston 77 to cut off the fast rate of flow therepast to the brake cylinder. Due to the omission of the choke-fitting 88, however, fluid under pressure continues to be supplied at a rapid rate through the tapped opening 89 to the brake cylinder, the ultimate value attainable in the brake cylinder corresponding to that established in the control pipe 11. A second wheel-slip condition may occur before brake cylinder pressure is fully restored to a value corresponding to the pressure established in the control pipe 11. In such case the pressure in the brake cylinder will be promptly reduced and then restored again in the manner characteristic of any wheel-slip cycle.

The reapplication control characteristic produced when the valve mechanism 16 is conditioned as shown in Fig. 4 is shown by the curve depicted in Fig. 8. As shown in Fig. 8, the vent valve mechanism 16 will be operated at the point A to rapidly reduce the pressure in the brake cylinder to the low value corresponding to the point B and then restore the pressure to the point H. It will be observed that the point H corresponds in value to brake cylinder pressure at the point A, indicating that no restriction is offered to the build-up of pressure in the brake cylinder following relief of the wheel-slip condition notwithstanding the reseating of the valve piston 77.

In Fig. 8 it is assumed that a wheel-slip condition occurs at the point H before brake cylinder pressure has had an opportunity to be restored fully to a value corresponding to the pressure established in the control pipe 11. During the second wheel-slip condition, brake cylinder pressure varies in accordance with the portion of the curve between the point H and J including the reduction to the low point I. At the point J the pressure in the brake cylinder has been restored fully to a value corresponding to that established in the control pipe 11 prior to the occurrence of a third wheel-slip condition.

Due to the fact that the coefficient of friction between the brake shoes and the tread of the car wheels tends to increase somewhat with reducing speed of the train, it will be apparent that a given brake cylinder pressure is more likely to produce a wheel-slip condition at a lower speed than at a higher speed. It follows, therefore, that when employing the type of reapplication control characteristic depicted in Fig. 8, repeated wheel-slip cycles are to be expected. In Fig. 8, therefore, a third and fourth wheel-slip cycle are shown, the third wheel-slip cycle being indicated by the portion of the brake cylinder pressure curve between the points K and M and extending through the low point L, and the fourth wheel-slip cycle being indicated by that portion of the brake cylinder pressure curve between the points N and P and including the low point O.

In actual effect, therefore, the operation of the reapplication control mechanism of the vent valve mechanism 16 is completely nullified when conditioned as shown in Fig. 4 and the same type of reapplication control characteristic would be obtained if the filling-piece section 27 were removed and the vent valve section 25 secured directly to the face of the mounting bracket section opposite to that to which the pipes are connected.

Figs. 2 and 9

The vent valve mechanism 16 shown in Fig. 2 may be adjusted merely by removing the end cover 29 and screwing the adjusting screw 11 inwardly until the force of the loading spring 110 on the charging valve 106 is such as to prevent any charging of the chamber 102. In such case, the reapplication control characteristic shown in Fig. 9 is attained. Assuming a wheel-slip condition to occur at the point A in Fig. 9, the vent valve section 25 of the vent valve mechanism 16 will be operated to reduce pressure in the brake cylinder to the point B just as in other instances. At the point B the differential piston valve 35 is operated to terminate the reduction of pressure in the brake cylinder and initiate the restoration of pressure therein. The initial build-up of pressure in the chamber 101 above the diaphragm 86, incidental to resupply of fluid under pressure to the brake cylinder, is effective to promptly seat the poppet valve 82, thus resulting in prompt reseating of the valve piston 77, because no fluid pressure exists in chamber 102. The restoration of the pressure in the brake cylinder is thus effected practically entirely at a restricted rate through the choke-fitting 88, as indicated by the gradual slope of that portion of the brake cylinder pressure curve between the points B and Q.

As indicated in Fig. 9, only one wheel-slip condition occurred during the application of the brakes and the pressure in the brake cylinder was, therefore, restored ultimately to a value corresponding to that established in the control pipe. Due to the fact that the pressure restored in the brake cylinder remains substantially below the point A at which the wheel-slip condition occurs throughout the remainder of the brake application, repeated wheel-slip cycles are unlikely in this type of reapplication control.

It will be apparent that a still different reapplication control characteristic may be attained, depending upon the degree of adjustment of loading spring 110 associated with the charging valve 106. The reapplication control characteristic attained, for example, if the adjustment of the loading spring 110 of the charging valve 106 were such as to permit a certain amount of charging of the chamber 102 would be similar to that depicted in Fig. 6 execpt that the points corresponding to the points C and F in Fig. 6, representing the instant that the valve piston 77 is reseated to terminate fast build-up of pressure in the brake cylinder following relief of a wheel-slip condition, would be correspondingly lower.

Figs. 5 and 10

If it is desired to obtain a reapplication control characteristic in which the pressure is restored in the brake cylinder, at a rapid rate, to a value lower than that existing in the brake cylinder at the time a wheel-slip condition occurs and to successively lower values with each succeeding wheel-slip cycle during a given brake application, the vent valve mechanism 16 may be conditioned as shown in Fig. 5. Such conditioning consists in the provision of a screw plug 150 in place of the choke-fitting 88, and a combination ball check valve and choke 151 in place of the screw plug 115.

Just as when the vent valve mechanism is conditioned as shown in Fig. 3, the provision of the plug 150 in place of the choke-fitting 88 as shown in Fig. 5 eliminates the the build-up of brake cylinder pressure at a restricted rate following reseating of the valve piston 77.

The combination ball check valve and choke 151 substituted for the plug 115 effects the reduction of the pressure in the chamber 102 while the brake cylinder pressure is being reduced by operation of the vent valve section 25 in response to the occurrence of a wheel-slip condition. The size of the orifice in the choke-fitting of the combined ball check valve and choke 151 is selected so as to effect a certain desired reduction of the pressure in the chamber 102 during the interval of time that the pressure in the brake cylinder is being reduced by operation of the vent valve section 25. For example, the orifice in the choke-fitting of the combined ball check valve and choke 151 may be such as to effect a reduction of five pounds per square inch during the interval of time that the brake cylinder pressure is being reduced by operation of the vent valve mechanism 25. In such case, therefore, it will be apparent that upon the resupply of fluid under pressure to the brake cylinder and thus to the chamber 101 above the diaphragm 86, the poppet valve 82 will be reseated at successively lower pressures restored in the brake cylinder with each succeeding wheel-slip cycle, thereby causing the valve piston 77 to be correspondingly reseated to cut-off the further supply of fluid under pressure to the brake cylinder at such point.

As shown in Fig. 10, the initial wheel-slip condition may occur at the point A, following which the pressure in the brake cylinder is reduced by operation of the vent valve section 25 to the point B, and then restored to the point C at a rapid rate.

Following restoration of the pressure in the brake cylinder to the point C and prior to the occurrence of a second wheel-slip condition at the point R, brake cylinder pressure remains unchanged at a value lower than that which existed at the point A at which the first wheel-slip condition occurred.

During the second wheel-slip condition, the vent valve section 25 is operated in the usual manner to reduce pressure in the brake cylinder to the point S and then restore pressure in the brake cylinder at a rapid rate to the point T, at which the valve piston 77 is reseated to terminate further resupply of fluid under pressure to the brake cylinder. It will be observed that the brake cylinder pressure at the point T is a certain amount lower than the brake cylinder pressure at the point C, such reduction in the limit of the pressure restorable in the brake cylinder being effected by the reduction of the pressure in the chamber 102 through the combination ball check valve and choke 151.

In view of the substantial reduction in the limit of brake cylinder pressure following the second wheel-slip condition, it is assumed that no further wheel-slip cycles will occur, notwithstanding the maintenance of the pressure in the control pipe 11 at a relatively higher value. This conditioning of the vent valve mechanism 16 is particularly advantageous because of the fact that the engineer of the train may set his brake valve handle 13a in a fixed position and allow it to remain therein until the train has been brought to a complete stop. There is no necessity for a graduated release when the valve mechanism 16 is conditioned as shown in Fig. 5 because the limit to which the pressure in the brake cylinder is restorable following each wheel-slip cycle is automatically successively reduced until the likelihood of further wheel-slip cycles is entirely eliminated.

Summary

Summarizing, it will be seen that I have disclosed novel control apparatus to be employed in the control of the brakes on vehicles, such as railway cars and trains, for the purpose of preventing the sliding of the vehicle wheels due to excessive braking thereof. Such control apparatus includes, among other elements, a vent valve mechanism adapted to be adjusted and conditioned in a manner to secure any one of a plurality of desired reapplication control characteristics for the pressure in the brake cylinder, following the relief of a wheel-slip condition, for the purpose of preventing or minimizing the likelihood of recurrent slipping cycles. Certain of the reapplication control characteristics may have been attained in prior known apparatus but my invention is of particular advantage and utility in that it enables a single valve mechanism to function to produce any one of a number of such reapplication control characteristics. For purposes of illustration five different reapplication control characteristics are referred to and discussed herein but additional variants of such control characteristics are possible.

The vent valve mechanism constituting a part of my present invention may, for example, be adjusted and conditioned to provide a reapplication control characteristic in which brake cylinder pressure is restored, at a rapid rate, up to a point which is a certain uniform amount below that existing in the brake cylinder at the instant a wheel-slip condition occurs and in which brake cylinder pressure is further restored at a relatively restricted rate. The point at which the rapid rate of pressure build-up is effected may be varied as desired merely by adjusting the setting of a charging valve controlling the charging of a control chamber. If desired, this setting of the charging valve may be so adjusted that the entire build-up of brake cylinder pressure is at a restricted rate.

The valve mechanism is adapted to be conditioned to eliminate any build-up of pressure in the brake cylinder after termination of build-up at a fast rate, merely by substituting a plug for a choke-fitting.

The valve mechanism is also adapted to be conditioned to effect restoration of the pressure in the brake cylinder, following relief of a wheel-slip condition, entirely at a rapid rate and without limitation with respect to the pressure existing in the brake cylinder at the instant the wheel-slip condition began, merely by omitting the choke-fitting.

The valve mechanism is further adapted to be conditioned to effect restoration of pressure in the brake cylinder, following relief of a wheel-slip condition, at a rapid rate up to a pressure that is a certain uniform amount below that existing in the brake cylinder preceding each of a plurality of wheel-slip conditions or cycles during any given brake application by providing (1) a plug in place of a choke-fitting and (2) a combination ball check valve and choke in place of a plug.

My novel vent valve mechanism is so constructed and arranged that, in instances where it is so conditioned, it functions to limit the pressure restored in the brake cylinder following a relief of a wheel-slip condition to a value lower than that existing in the brake cylinder at the instant a wheel-slip condition begins, rather than with reference to a control pipe pressure, which may rise to a value higher than that existing in the brake cylinder at the instant a wheel-slip condition begins, thereby reducing the likelihood of repeated wheel-slip cycles.

The above features and other features of my invention are hereinafter more fully set forth in the appended claims.

Having now described my invention, what I claim as new and desire to secure by Letters Patent, is:

1. Apparatus for controlling the supply of fluid under pressure to and the release of fluid under pressure from a fluid pressure receiving device, said apparatus comprising valve means normally conditioned to provide a communication through which fluid under pressure may be supplied to the receiving device, said valve means being operative to close said supply communication and establish a different communication through which fluid under pressure is released to effect a reduction of the pressure in the receiving device and thereafter to close said different communication and reestablish the supply communication to the receiving device, a valve device so constructed and arranged as to terminate the supply of fluid under pressure to the receiving device, and means variously conditioned responsively to each successive operation of the valve means for so governing the operation of the said valve device as to cause it to limit the pressure re-established in the receiving device to successively lower values following each successive time the valve means operates to reduce the pressure in the receiving device.

2. Apparatus for controlling the supply of fluid under pressure to and the release of fluid under pressure from a fluid pressure receiving device, said apparatus comprising valve means normally conditioned to provide a communication through which fluid under pressure may be supplied to the receiving device, said valve means being operative to close said supply communication and establish a venting communication to effect reduction of the pressure in the receiving device and thereafter to close the venting communication and restore said supply communication, a control chamber, means for charging said control chamber with fluid at a pressure lower than the pressure established in the receiving device, and means for changing the rate of resupply of fluid under pressure to the receiving device when the fluid pressure reestablished in the fluid pressure receiving device corresponds substantially to that established in said control chamber.

3. Apparatus for controlling the supply of fluid under pressure to and the release of fluid under pressure from a fluid pressure receiving device, said apparatus comprising valve means normally conditioned to provide a communication through which fluid under pressure may be supplied to the receiving device, said valve means being operative to close said supply communication and establish a venting communication to effect reduction of the pressure in the receiving device and thereafter to close the venting communication and restore said supply communication, a control chamber, means for charging said control chamber with fluid at a pressure lower than the pressure established in the receiving device, and control means for terminating build-up of pressure in the receiving device when the pressure in the receiving device corresponds substantially to that in the control chamber.

4. Apparatus for controlling the supply of fluid under pressure to and the release of fluid under pressure from a fluid pressure receiving device, said apparatus comprising valve means normally conditioned to provide a communication through which fluid under pressure may be supplied to the receiving device, said valve means being operative to close said supply communication and establish a venting communication to effect reduction of the pressure in the receiving device and thereafter to close the venting communication and restore said supply communication, a control chamber, means adapted to be adjusted to cause charging of said control chamber to any one of a plurality of different pressures lower than the pressure in the receiving device, and control means for terminating a fast build-up of pressure in the receiving device when the pressure in the receiving device corresponds to that in the control chamber and thereafter causing a further build-up of pressure in the receiving device at a relatively slow rate.

5. A control valve mechanism for controlling the supply of fluid under pressure to and the release of fluid under pressure from a fluid pressure receiving device, said valve mechanism comprising a vent valve device normally conditioned to provide a communication through which fluid under pressure may be supplied to the receiving device and operative first to close said supply communication and establish an exhaust communication for effecting reduction of the pressure in the receiving device and then to close said exhaust communication and establish the supply communication, a control valve in the communication through which fluid under pressure is supplied to the receiving device adapted to be opened in response to the pressure of fluid supplied to the receiving device to permit the rapid supply of fluid under pressure therepast to the receiving device, a chamber, a charging valve past which fluid under pressure being supplied to the receiving device flows to charge the chamber, said charging valve device being effective to limit the pressure of the fluid established in the chamber to a value less than that established in the receiving device, means for effecting the release of fluid under pressure from the control chamber at a relatively slow rate in response to a reduction of the pressure in the receiving device effected while the vent valve device is operative to effect such reduction, fluid pressure responsive means subject on one side to the pressure in the said chamber and on the opposite side to the pressure in a second chamber, means operative in response to a reduction of the pressure in the receiving device by operation of the vent valve device to prevent the further supply of fluid under pressure past said charging valve to the said chamber and to establish a communication through which the said second chamber is charged according to the pressure resupplied to the receiving device, said fluid pressure responsive means being effective upon substantial equalization of the pressure in said second chamber with that in the said chamber, following operation of the vent valve device to resupply fluid under pressure to the fluid pressure receiving device, for effecting operation of the said control valve to closed position to thereafter prevent the supply of fluid under pressure therepast to the receiving device.

6. A control valve mechanism for controlling the supply of fluid under pressure to and the release of fluid under pressure from a fluid pressure receiving device, said valve mechanism comprising a vent valve device normally conditioned to provide a communication through which fluid under pressure may be supplied to the receiving device and operative first to close said supply communication and establish an exhaust communication for effecting reduction of the pressure in the receiving device and then to close said exhaust communication and establish the supply communication, a control valve in the communication through which fluid under pressure is supplied to the receiving device adapted to be opened in response to the pressure of fluid supplied to the receiving device to permit the rapid supply of fluid under pressure therepast to the receiving device, a chamber, a charging valve past which fluid under pressure being supplied to the receiving device flows to charge the chamber, said charging valve device being effective to limit the pressure of the fluid established in the chamber to a value less than that established in the receiving device, means for effecting a continued release of fluid under pressure from the control chamber in response to a reduction of the pressure in the receiving device only while the vent valve device is operative to effect such reduction, fluid pressure responsive means subject on one side to the pressure in the said chamber and on the opposite side to the pressure in a second chamber, means operative in response to a reduction of the pressure in the receiving device by operation of the vent valve device to prevent the further supply of fluid under pressure past said charging valve to the said chamber and to establish a communication through which the said second chamber is charged according to the pressure resupplied to the receiving device, said fluid pressure responsive means being effective upon substantial equalization of the pressure in said second chamber with that in the said chamber, following operation of the vent valve device to resupply fluid under pressure to the fluid pressure receiving device, for effecting operation of the said control valve to closed position to thereafter prevent the supply of fluid under pressure therepast to the receiving device, and a passage in parallel relation to said control valve through which fluid under pressure may be supplied to the receiving device at a restricted rate notwithstanding closure of said control valve.

7. In a vehicle brake control system of the type having a brake cylinder effective upon the supply of fluid under pressure thereto to effect application of the brakes and upon the release of fluid under pressure therefrom to effect release of the brakes associated with a wheel of the vehicle and a control pipe chargeable with fluid at different pressures, the combination of valve means normally providing a communication through which fluid under pressure may be supplied from the control pipe to the brake cylinder, said valve means being operative to first effect a reduction of the pressure in the brake cylinder and then a resupply of fluid under pressure thereto, and reapplication control means variously conditioned according to the fluid pressure in the brake cylinder at the time said valve means operates to effect a reduction of the pressure in the brake cylinder for effecting a reduction in the rate at which fluid under pressure is resupplied to the brake cylinder, when the fluid pressure restored in the brake cylinder by operation of said valve means attains a certain value varying according to the pressure in the brake cylinder at the time said valve means operates.

8. In a vehicle brake control system of the type having a brake cylinder effective upon the supply of fluid under pressure thereto to effect application of the brakes and upon the release of fluid under pressure therefrom to effect release of the brakes associated with a wheel of the vehicle and control pipe chargeable with fluid at different pressures, the combination of valve means normally providing a communication through which fluid under pressure may be supplied from the control pipe to the brake cylinder, said valve means being operative to first effect a reduction of the pressure in the brake cylinder and then a resupply of fluid under pressure thereto at a rapid rate, a control chamber, means for charging said control chamber with fluid at a pressure lower than that established in the brake cylinder, and control means for terminating the resupply of fluid under pressure at a rapid rate to the brake cylinder when the pressure of the fluid being resupplied to the brake cylinder corresponds substantially to that in the control chamber.

9. In a vehicle brake control system of the type having a brake cylinder effective upon the supply of fluid under pressure thereto to effect application of the brakes and upon the release of fluid under pressure therefrom to effect release of the brakes associated with a wheel of the vehicle, and a control pipe chargeable with fluid at different pressures, the combination of valve means normally providing a communication through which fluid under pressure may be supplied from the control pipe to the brake cylinder, said valve means being operative to first effect a reduction of the pressure in the brake cylinder and then a resupply of fluid under pressure thereto, a control chamber, charging valve means past which fluid being supplied to the brake cylinder flows to charge the control chamber, said charging valve means being adjustable to limit the pressure established in the control chamber to any one of a plurality of different selected pressures lower than that established in the brake cylinder, and reapplication control means for controlling the resupply of fluid under pressure to the brake cylinder and operative upon restoration of a pressure in the brake cylinder corresponding to that established in the control chamber to terminate the resupply of fluid under pressure at a rapid rate to the brake cylinder and to continue the resupply thereafter at a restricted rate.

10. In a vehicle brake system of the type having a brake cylinder effective upon the supply of fluid under pressure thereto to cause an application of the brakes associated with a wheel of the vehicle and in response to a release of the fluid under pressure therefrom to effect a release of the brakes associated with the vehicle wheel, and a control pipe chargeable with fluid at different pressures under the control of the operator to select the degree of application of the brakes, the combination of valve means normally conditioned to provide a communication through which fluid under pressure may be supplied from the control pipe to the brake cylinder, said valve means being operative to close said supply communication and open an exhaust communication whereby to effect a reduction of the pressure in the brake cylinder and thereafter to close said exhaust communication and restore said supply communication, means operative in response to the slipping of said vehicle wheel for causing operation of the valve means, a control chamber, charging valve means past which fluid under pressure being supplied to the brake cylinder flows to charge the control chamber, said charging valve means being operative to limit the pressure established in the control chamber to a value lower than that established in the brake cylinder, a valve device normally in a position to permit fluid under pressure to be supplied through said charging valve means, fluid pressure responsive means subject on one side to the pressure in the control pipe and effective to cause operation of the said valve device to a position preventing the further supply of fluid under pressure through the charging valve means to the control chamber upon the first reduction of pressure in the brake cylinder during a given application of the brakes in response to operation of the vent valve means and effective thereafter to hold said valve device in such position throughout the remainder of the application so as to trap fluid in said control chamber at a pressure lower than that initially established in the brake cylinder, a one-way valve for preventing the supply of fluid under pressure therepast to the control chamber and effective to permit the release of fluid under pressure from the control chamber in response to the reduction of the pressure in the control pipe, a valve normally operative in response to the pressure of fluid being supplied to the brake cylinder to permit the supply of fluid under pressure therepast at a rapid rate, and means effective in response to the attainment of a pressure in the brake cylinder corresponding substantially to that trapped in the control chamber for causing said valve to be operated to prevent the further supply of fluid under pressure therepast to the brake cylinder.

11. In a vehicle brake system of the type having a brake cylinder effective upon the supply of fluid under pressure thereto to cause an application of the brakes associated with a wheel of the vehicle and in response to a release of the fluid under pressure therefrom to effect a release of the brakes associated with the vehicle wheel, and a control pipe chargeable with fluid at different pressures under the control of the operator to select the degree of application of the brakes, the combination of valve means normally conditioned to provide a communication through which fluid under pressure may be supplied from the control pipe to the brake cylinder, said valve means being operative to close said supply communication and open an exhaust communication whereby to effect a reduction of the pressure in the brake cylinder and thereafter to close said exhaust communication and restore said supply communication, means operative in response to the slipping of said vehicle wheel for causing operation of the valve means, a control chamber, charging valve means past which fluid under pressure being supplied to the brake cylinder flows to charge the control chamber, said charging valve means being operative to limit the pressure established in the control chamber to a value lower than that established in the brake cylinder, a valve device normally in a position to permit fluid under pressure to be supplied through said charging valve means, fluid pressure responsive means subject on one side to the pressure in the control pipe and effective to cause operation of the said valve device to a position preventing the further supply of fluid under pressure through the charging valve means to the control chamber upon the first reduction of pressure in the brake cylinder during a given application of the brakes in response to operation of the vent valve means and effective thereafter to hold said valve device in such position throughout the remainder of the application so as to trap fluid in said control chamber at a pressure lower than that initially established in the brake cylinder, a one-way valve for preventing the supply of fluid under pressure therepast to the control chamber and effective to permit the release of fluid under pressure from the control chamber in response to the reduction of the pressure in the control pipe, a valve normally operative in response to the pressure of fluid being supplied to the brake cylinder to permit the supply of fluid under pressure therepast at a rapid rate, and means effective in response to the attainment of a pressure in the brake cylinder corresponding substantially to that trapped in the control chamber for causing said valve to be operated to prevent the further supply of fluid under pressure therepast to the brake cylinder, said valve device being operative to render the last said means effective only after said valve device is operated to prevent the further charging flow to the control chamber.

12. In a vehicle brake system of the type having a brake cylinder effective upon the supply of fluid under pressure thereto to cause an application of the brakes associated with a wheel of the vehicle and in response to a release of the fluid under pressure therefrom to effect a release of the brakes associated with the vehicle wheel, and a control pipe chargeable with fluid at different pressures under the control of the operator to select the degree of application of the brakes, the combination of valve means normally conditioned to provide a communication through which fluid under pressure may be supplied from the control pipe to the brake cylinder, said valve means being operative to close said supply communication and open an exhaust communication whereby to effect a reduction of the pressure in the brake cylinder and thereafter to close said exhaust communication and restore said supply communication, means operative in response to the slipping of said vehicle wheel for causing operation of the valve means, a control chamber, charging valve means past which fluid under pressure being supplied to the brake cylinder flows to charge the control chamber, said charging valve means being operative to limit the pressure established in the control chamber to a value lower than that established in the brake cylinder, a valve device normally in a position to permit fluid under pressure to be supplied through said charging valve means, fluid pressure responsive means subject on one side to the pressure in the control pipe and effective to cause operation of the said valve device to a position preventing the further supply of fluid under pressure through the charging valve means to the control chamber upon the first reduction of pressure in the brake cylinder during a given application of the brakes in response to operation of the vent valve means and effective thereafter to hold said valve device in such position throughout the remainder of the application so as to trap fluid in said control chamber at a pressure lower than that initially established in the brake cylinder, a one-way valve for preventing the supply of fluid under pressure therepast to the control chamber and effective to permit the release of fluid under pressure from the control chamber in response to the reduction of the pressure in the control pipe, a valve normally operative in response to the pressure of fluid being supplied to the brake cylinder to permit the supply of fluid under pressure therepast at a rapid rate, fluid pressure responsive means subject on one side to the pressure in the control chamber and on the opposite side to the pressure in a second chamber, said valve device being effective upon operation to prevent the further supply of fluid to the control chamber to establish a communication whereby said second chamber is charged according to the pressure established in the brake cylinder, and means operative in response to the substantial equalization of the pressure in the brake cylinder and in the second chamber with that in the said control chamber for causing said valve to remain in closed position thereafter to prevent the further supply of fluid under pressure therepast to the brake cylinder.

13. In a vehicle brake system of the type having a brake cylinder effective upon the supply of fluid under pressure thereto to cause an application of the brakes associated with a wheel of the vehicle and in response to a release of the fluid under pressure therefrom to effect a release of the brakes associated with the vehicle wheel, and a control pipe chargeable with fluid at different pressures under the control of the operator to select the degree of application of the brakes, the combination of valve means normally conditioned to provide a communication through which fluid under pressure may be supplied from the control pipe to the brake cylinder, said valve means being operative to close said supply communication and open an exhaust communication whereby to effect a reduction of the pressure in the brake cylinder and thereafter to close said exhaust communication and restore said supply communication, means operative in response to the slipping of said vehicle wheel for causing operation of the valve means, a control chamber, a first one-way valve arranged to permit the flow of fluid under pressure therepast from the communication through which fluid under pressure is being supplied to the brake cylinder to the control chamber, means for loading said one-way valve to limit the pressure in the control chamber to a value less than that established in the brake cylinder, a second one-way valve arranged to prevent the supply of fluid under pressure to said control chamber therepast and to permit the reverse flow of fluid under pressure therepast upon reduction of the pressure in the control pipe to effect the release of fluid under pressure from the control chamber, a third one-way valve arranged to prevent the supply of fluid under pressure therepast to the control chamber and to permit reverse flow of fluid under pressure therepast from the control chamber in accordance with the reduction of the pressure in the brake cylinder, means for restricting the rate of reduction of the pressure in the control chamber past said third one-way valve to a relatively slow rate whereby to effect a predetermined desired reduction of the pressure in the control chamber during the interval of time that the brake cylinder pressure is being reduced in response to operation of said vent valve device, and reapplication control means for causing the rapid resupply of fluid under pressure to the brake cylinder only so long as the pressure attained in the brake cylinder does not exceed that in the control chamber.

14. In a vehicle brake system of the type having a brake cylinder effective upon the supply of fluid under pressure thereto to cause an application of the brakes associated with a wheel of the vehicle and in response to a release of the fluid under pressure therefrom to effect a release of the brakes associated with the vehicle wheel, and a control pipe chargeable with fluid at different pressures under the control of the operator to select the degree of application of the brakes, the combination of valve means normally conditioned to provide a communication through which fluid under pressure may be supplied from the control pipe to the brake cylinder, said valve means being operative to close said supply communication and open an exhaust communication whereby to effect a reduction of the pressure in the brake cylinder and thereafter to close said exhaust communication and restore said supply communication, means operative in response to the slipping of said vehicle wheel for causing operation of the valve means, a control chamber, a first one-way valve arranged to permit the flow of fluid under pressure therepast from the communication through which fluid under pressure is being supplied to the brake cylinder to the control chamber, means for loading said one-way valve to limit the pressure in the control chamber to a value less than that established in the brake cylinder, a second one-way valve arranged to prevent the supply of fluid under pressure to said control chamber therepast and to permit the reverse flow of fluid under pressure therepast upon reduction of the pressure in the control pipe to effect the release of fluid under pressure from the control chamber, means providing a passage through which to establish a connection between the control chamber and the brake cylinder, means disposed in said passage for permitting the flow of fluid under pressure therepast from the control chamber at a restricted rate, thereby to effect reduction of pressure in the said control chamber along with reduction of pressure in the brake cylinder, and reapplication control means for causing the rapid resupply of fluid under pressure to the brake cylinder only so long as the pressure attained in the brake cylinder does not exceed that remaining in the control chamber.

15. Control apparatus, for controlling the supply of fluid under pressure from a source of fluid pressure supply to a fluid pressure receiving device and for releasing fluid under pressure from the fluid pressure receiving device, comprising a vent valve mechanism normally conditioned to establish a communication through which fluid under pressure may be supplied from the source to the fluid pressure receiving device and operative automatically to cut off the supply of fluid under pressure to the fluid pressure receiving device, effect reduction of the pressure in the fluid pressure receiving device to a certain value, and then reestablish the communication through which fluid under pressure may be resupplied to the fluid pressure receiving device, valve means operative to terminate the supply of fluid under pressure from said valve mechanism to the fluid pressure receiving device notwithstanding said vent valve mechanism being in its normal condition, and means for rendering said valve means effective to terminate the supply of fluid under pressure past said valve means to the fluid pressure receiving device only after the pressure in the fluid pressure receiving device has first been reduced to said certain value in response to operation of the vent valve mechanism.

16. Control apparatus, for controlling the supply of fluid under pressure from a source of fluid pressure to a fluid pressure receiving device and the release of fluid under pressure from the fluid pressure receiving device, comprising means providing two passages, one of which is adapted to be connected to said source of fluid pressure and the other of which is connected to said fluid pressure receiving device, valve means normally conditioned to permit the supply of fluid under pressure from said one passage to said other passage, venting means operative to cut off the connection between the source of fluid pressure and said one passage, vent fluid under pressure from said one passage, and then restore the connection between the source of fluid pressure and said one passage, a one-way valve for preventing the supply of fluid under pressure from said one passage to said other passage while permitting reverse flow of fluid under pressure therepast to enable reduction of the pressure in the fluid pressure receiving device in response to operation of the said venting means, and means conditioned responsively to the reduction of the pressure in the fluid pressure receiving device, while the fluid pressure in said source is maintained, for controlling the valve means in a manner to cause the valve means to operate to terminate the supply of fluid under pressure therepast from said one passage to said second passage and the connected fluid pressure receiving device when the pressure of the fluid reestablished in the fluid pressure receiving device attains a value that is a certain amount lower than that established in the fluid pressure receiving device prior to the operation of said venting means.

17. Control apparatus comprising the combination with a vent valve mechanism of the type normally conditioned to establish communication through which fluid under pressure may be supplied from a source adapted to be charged with fluid at different pressures to a fluid pressure receiving device and operative automatically to effect a reduction of the pressure in the fluid pressure receiving device to a certain low value and then reestablish the communication through which fluid under pressure may be supplied from the source to the fluid pressure receiving device, of means providing two passages, one of which passages is adapted to receive fluid under pressure from the vent valve mechanism and the other of which is connected to the fluid pressure receiving device, valve means normally conditioned to enable the supply of fluid under pressure from said one to said other passage to establish a fluid pressure in the said receiving device equal to the fluid pressure of said source, a one-way valve preventing the supply of fluid under pressure from said one passage to said other passage while permitting reverse flow of fluid under pressure therepast to enable the reduction of the pressure in the fluid pressure receiving device at a rapid rate in response to the operation of the vent valve mechanism, and means conditioned responsively to the reduction of the pressure in the fluid pressure receiving device to said certain low value by operation of the vent valve mechanism for controlling said valve means in a manner to cause it to terminate the supply of fluid under pressure from said one passage to said other passage when the pressure of the fluid reestablished in the fluid pressure receiving device, following reduction of the pressure therein by operation of the vent valve mechanism, attains a value that is a certain amount lower than that established in the fluid pressure receiving device at the time said vent valve mechanism is operated to reduce the pressure in the fluid pressure receiving device.

18. Control apparatus comprising the combination with a vent valve mechanism of the type normally conditioned to establish communication through which fluid under pressure may be supplied from a source adapted to be charged with fluid at different pressures to a fluid pressure receiving device and operative automatically to effect a reduction of the pressure in the fluid pressure receiving device to a certain low value and then reestablish the communication through which fluid under pressure may be supplied from the source to the fluid pressure receiving device, of means providing two passages, one of which passages is adapted to receive fluid under pressure from the vent valve mechanism and the other of which is connected to the fluid pressure receiving device, valve means normally conditioned to enable the supply of fluid under pressure from said one to said other passage to establish a fluid pressure in the said receiving device equal to the fluid pressure of said source, a one-way valve preventing the supply of fluid under pressure from said one passage to said other passage while permitting reverse flow of fluid under pressure therepast to enable the reduction of the pressure in the fluid pressure receiving device at a rapid rate in response to the operation of the vent valve mechanism, means conditioned responsively to the reduction of the pressure in the fluid pressure receiving device to said certain low value by operation of the vent valve mechanism for controlling said valve means in a manner to cause it to terminate the supply of fluid under pressure from said one passage to said other passage when the pressure of the fluid reestablished in the fluid pressure receiving device, following reduction of the pressure therein by operation of the vent valve mechanism, attains a value that is a certain amount lower than that established in the fluid pressure receiving device at the time said vent valve mechanism is operated to reduce the pressure in the fluid pressure receiving device, a communication connecting said one passage and said other passage through which fluid under pressure may flow at a rapid rate to the fluid pressure receiving device notwithstanding termination of the connection between said one and said other passage by said valve means, and means adapted to be interposed in the last said communication whereby the rate of flow from said one passage to said other passage therethrough may be limited to a desired rate or prevented entirely.

19. Control apparatus comprising the combination with a vent valve mechanism for controlling the supply of fluid under pressure from a source of fluid pressure to a fluid pressure receiving device and the release of fluid under pressure from the receiving device, of means providing two passages, one of which is adapted to be alternatively connected to the source of supply or to atmosphere by said vent valve mechanism and the other of which is connected to the fluid pressure receiving device, valve means conditioned in accordance with the pressure established in the fluid pressure receiving device at the instant the vent valve mechanism operates to effect a reduction of the pressure therein and operative, following operation of the vent valve mechanism to resupply fluid under pressure to the fluid pressure receiving device, to terminate the supply of fluid under pressure from said one passage to said second passage therepast upon the attainment of a pressure in the fluid pressure receiving device that is a certain amount lower than that in the fluid pressure receiving device at the time the vent valve mechanism first operated to effect a reduction of the pressure therein, a communication connecting said one passage and said other passage through which fluid under pressure may be supplied to the fluid pressure receiving device notwithstanding termination of the connection between said one and said other passage by operation of said valve means, and means adapted to be interposed in the last said communication whereby to limit the rate of flow of fluid under pressure to the fluid pressure receiving device following termination of the connection between the said one and said other passage by said valve means to a selected rate or to prevent such flow entirely.

20. Control apparatus comprising the combination with a vent valve mechanism for controlling the supply of fluid under pressure from a source of fluid pressure to a fluid pressure receiving device and the release of fluid under pressure from the receiving device, of means providing two passages, one of which is adapted to be alternatively connected to the source of supply or to atmosphere by said vent valve mechanism and the other of which is connected to the fluid pressure receiving device, valve means normally conditioned to permit the supply of fluid under pressure from said one passage to said other passage at a rapid rate to enable the establishment of a pressure in the fluid pressure receiving device up to the pressure of said source, means conditioned in accordance with the pressure established in the fluid pressure receiving device at the instant the vent valve mechanism operates to effect a reduction of the pressure therein and operative, following the reduction of the pressure in the fluid pressure receiving device, to render said valve means thereafter effective to terminate the supply of fluid under pressure being resupplied to the fluid pressure receiving device therepast when the pressure attained in the fluid pressure receiving device is a certain selected amount below that established in the fluid pressure receiving device at the instant the vent valve mechanism first operated to effect a reduction of the pressure therein.

21. Control apparatus comprising the combination with a vent valve mechanism operative to control the supply of fluid under pressure from a fluid pressure source to a fluid pressure receiving device and the release of fluid under pressure from the fluid pressure receiving device, of a control chamber, means for charging said chamber with fluid under pressure being supplied to the fluid pressure receiving device and operative to limit the pressure established in the control chamber to a selected amount lower than that established in the fluid pressure receiving device, valve means normally conditioned to permit the supply of fluid under pressure from said vent valve mechanism to the fluid pressure receiving device at a rapid rate up to the full pressure of said source, and means effective in response to a reduction of the pressure in the fluid pressure receiving device by operation of the vent valve mechanism for preventing further charging of said control chamber so long as the pressure of said source is maintained and, at the same time, being effective to render said valve means operative to terminate the supply of fluid under pressure therepast to the fluid pressure receiving device upon the attainment of a fluid pressure in the fluid pressure receiving device substantially equal to that established in the control chamber.

22. Control apparatus comprising the combination with a vent valve mechanism operative to control the supply of fluid under pressure from a fluid pressure source to a fluid pressure receiving device and the release of fluid under pressure from the fluid pressure receiving device, of a control chamber, means for charging said chamber with fluid under pressure being supplied to the fluid pressure receiving device and operative to limit the pressure established in the control chamber to a selected amount lower than that established in the fluid pressure receiving device, a communication through which fluid under pressure is released from the control chamber concurrently with the reduction of the pressure in the fluid pressure receiving device but at a relatively slow rate, valve means normally conditioned to permit the supply of fluid under pressure from the vent valve mechanism to the fluid pressure receiving device to enable the establishment therein of a pressure up to the pressure of said source, and means operative upon a reduction of the pressure in the fluid pressure receiving device by operation of the vent valve mechanism for preventing further charging of said control chamber thereafter so long as the pressure of said source is maintained, and means rendered effective in response to the operation of the last said means for controlling the valve means so as to cause it to terminate the supply of fluid under pressure therepast to the fluid pressure receiving device whenever the fluid pressure reestablished in the fluid pressure receiving device attains a value corresponding substantially to that remaining in the control chamber.

23. Control apparatus comprising the combination with a vent valve mechanism operative to control the supply of fluid under pressure from a fluid pressure source to a fluid pressure receiving device and the release of fluid under pressure from the fluid pressure receiving device, of a control chamber, means for charging said chamber with fluid under pressure being supplied to the fluid pressure receiving device and operative to limit the pressure established in the control chamber to a selected amount lower than that established in the fluid pressure receiving device, valve means normally conditioned to permit the supply of fluid under pressure from said vent valve mechanism to the fluid pressure receiving device at a rapid rate up to the full pressure of said source, means effective in response to a reduction of the pressure in the fluid pressure receiving device by operation of the vent valve mechanism for preventing further charging of said control chamber so long as the pressure of said source is maintained and, at the same time, being effective to render said valve means operative to terminate the supply of fluid under pressure therepast to the fluid pressure receiving device upon the attainment of a fluid pressure in the fluid pressure receiving device substantially equal to that established in the control chamber, and means for releasing fluid under pressure from said control chamber responsively to the reduction of the pressure of said source.

24. Control apparatus comprising the combination with a vent valve mechanism operative to control the supply of fluid under pressure from a fluid pressure source to a fluid pressure receiving device and the release of fluid under pressure from the fluid pressure receiving device, of a control chamber, means for charging said chamber with fluid under pressure being supplied to the fluid pressure receiving device and operative to limit the pressure established in the control chamber to a selected amount lower than that established in the fluid pressure receiving device, means providing a communication through which the pressure in the control chamber may be reduced concurrently with the reduction of the pressure in the fluid pressure receiving device, means adapted to be interposed in the last said communication to restrict the rate at which fluid under pressure may be released from the control chamber or to prevent such release entirely, valve means normally conditioned to permit the supply of fluid under pressure to the fluid pressure receiving device to enable the establishment therein of a pressure up to the pressure of said source, means responsive to a reduction of the pressure in the fluid pressure receiving device by operation of the vent valve mechanism for preventing thereafter further charging of said control chamber and effective to condition the valve means so as to be responsive to the attainment of a pressure in the fluid pressure receiving device corresponding substantially to that remaining in the control chamber to terminate the further supp'y of fluid under pressure therepast to the fluid pressure receiving device.

25. A control valve mechanism for controlling the supply of fluid under pressure from a source of fluid under pressure to a receiving device and the release of fluid under pressure from the receiving device, said control valve mechanism comprising a sectionalized casing including a pipe bracket section, a vent valve section and a unit casing section adapted to be interposed between the pipe bracket section and the vent valve section, valve mechanism in sa'd vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply commun'cation, means in said unit casing section providing a restricted communication through which fluid under pressure may be supplied at a restricted rate to the receiving device under control of said valve mechanism, a one-way valve disposed in by-passing relation to said restricted communication for preventing the supply of fluid under pressure therepast to the receiving device and for permitting the rapid flow of fluid under pressure therepast in the reverse direction to release fluid under pressure from the receiving device, a valve disposed in by-passing relation to said restricted communication and normally conditioned to permit the rapid flow of fluid under pressure therepast to the receiving device, and means in said unit casing section adapted to be governed by the pressure of the fluid resupplied to the receiving device for causing said valve to operate to prevent the supply of fluid under pressure therepast to the receiving device.

26. A control valve mechanism for controlling the supply of fluid under pressure from a source of fluid under pressure to a receiving device and the release of fluid under pressure from the receiving device, said control valve mechanism comprising a sectionalized casing including a pipe bracket section, a vent valve section and a unit casing section adapted to be interposed between the pipe bracket section and the vent valve section, valve mechanism in said vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply communication, means in said unit casing section providing a restricted communication through which fluid under pressure may be supplied at a restricted rate to the receiving device under control of said valve mechanism, a one-way valve disposed in by-passing relation to said restricted communication for preventing the supply of fluid under pressure therepast to the receiving device and for permitting the rapid flow of fluid under pressure therepast in the reverse direction to release fluid under pressure from the receiving device, a valve disposed in by-passing relation to said restricted communication and normally conditioned to permit the rapid flow of fluid under pressure therepast to the receiving device, a control chamber in said unit casing section, a charging valve for causing said control chamber to be charged with fluid under pressure concurrently with the supply of fluid under pressure to the receiving device, means adapted to condition said charging valve to limit the pressure to which said control chamber is charged to any one of a number of different values lower than that to which the receiving device is charged, and means operated in response to the resupply of fluid under pressure to the receiving device when the pressure reestablished in the receiving device attains a value corresponding to that existing in said control chamber for causing said valve to operate to terminate the flow of fluid under pressure therepast to the receiving device.

27. A control valve mechan'sm for controlling the supply of fluid under pressure frcm a source of fluid under pressure to a receiving device and the release of fluid under pressure from the receiving device, said control valve mechanism comprising a sectionalized casing including a pipe bracket section, a vent valve section and a unit casing section adapted to be interpcsed between the pipe bracket section and the vent valve section, valve mechanism in said vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply communication, means in said unit casing section providing a restricted communication through which fluid under pressure may be supplied at a restricted rate to the receiving device under control of said valve mechanism, a one-way valve disposed in by-passing relation to said restricted communication for preventing the supply cf fluid under pressure therepast to the receiving device and for permitting the rapid flow of fluid under pressure therepast in the reverse direction to release fluid under pressure from the receiving device, a valve disposed in by-passing relation to said restricted communication and normally conditioned to permit the rapid flow of fluid under pressure therepast to the receiving device, a control chamber in said unit casing section, a charging valve for causing said control chamber to be charged with fluid under pressure concurrently with the supply of fluid under pressure to the receiving device, means adapted to condition said charging valve to limit the pressure to which said control chamber is charged to any one of a number of different values lower than that to which the receiving device is charged, means for effecting a reduction of the pressure in said control chamber in response to a reduction of the pressure in the receiving device, and means operated in response to the resupply of fluid under pressure to the receiving device when the pressure reestablished in the receiving device attains a value corresponding to that existing in said control chamber for causing said valve to operate to terminate the flow of fluid under pressure therepast to the receiving device.

28. A control valve mechanism for controlling the supply of fluid under pressure from a source of fluid under pressure to a receiving device and the release of fluid under pressure from the receiving device, said control valve mechanism comprising a sectionalized casing including a pipe bracket section to which the source and the receiving device are connected, a vent valve section, and a unit casing section adapted to be interposed between the pipe bracket section and the vent valve section, valve mechanism in said vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply communication, valve means in said unit casing section normally operative in response to the supply of fluid under pressure to the receiving device to permit the flow of fluid under pressure therepast to the receiving device, a one-way valve in said unit casing section arranged in by-passing relation to said valve means in such a manner as to prevent the flow of fluid under pressure therepast to the receiving device and to permit reverse flow of fluid under pressure therepast from the receiving device at a rapid rate, and means in said unit casing section rendered effective in response to a reduction of the fluid pressure in the receiving device by operation of said valve mechanism for causing said valve means to be operated to prevent the further supply of fluid under pressure therepast to the receiving device when a predetermined fluid pressure less than that initially established in the receiving device is restored therein.

29. A control valve mechanism for controlling the supply of fluid under pressure from a source of fluid under pressure to a receiving device and the release of fluid under pressure from the receiving device, said control valve mechanism comprising a sectionalized casing including a pipe bracket section to which the source and the receiving device are connected, a vent valve section, and a unit casing section adapted to be interposed between the pipe bracket section and the vent valve section, valve mechanism in said vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply communication, valve means in said unit casing section normally operative in response to the supply of fluid under pressure to the receiving device to permit the flow of fluid under pressure therepast to the receiving device, a one-way valve in said unit casing section arranged in by-passing relation to said valve means in such a manner as to prevent the flow of fluid under pressure therepast to the receiving device and to permit reverse flow of fluid under pressure therepast from the receiving device at a rapid rate, a chamber in said unit casing section, means for causing said chamber to be charged with fluid under pressure being supplied to the receiving device and effective to limit the pressure established in the chamber to a value less than that established in the receiving device, and means in said unit casing section adapted to be subject in opposing relation to the pressure in the chamber and the pressure of fluid resupplied to the receiving device, following a reduction of pressure therein by operation of said valve mechanism, and responsive to the establishment of a pressure in the receiving device corresponding substantially to that existing in said chamber for causing said valve means to be operated to terminate flow of fluid under pressure therepast to the receiving device.

30. A control valve mechanism for controlling the supply of fluid under pressure from a source of fluid under pressure to a receiving device and the release of fluid under pressure from the receiving device, said control valve mechanism comprising a sectionalized casing including a pipe bracket section to which the source and the receiving device are connected, a vent valve section, and a unit casing section adapted to be interposed between the pipe bracket section and the vent valve section, valve mechanism in said vent valve section normally conditioned to establish communication through which fluid under pressure may be supplied from the source to the receiving device and operative to close said supply communication, establish an exhaust communication through which fluid under pressure is released from the receiving device to reduce the pressure therein, and then to close said exhaust communication and restore said supply communication, valve means in said unit casing section normally operative in response to the supply of fluid under pressure to the receiving device to permit the flow of fluid under pressure therepast to the receiving device, a one-way valve in said unit casing section arranged in by-passing relation to said valve means in such a manner as to prevent the flow of fluid under pressure therepast to the receiving device and to permit reverse flow of fluid under pressure therepast from the receiving device at a rapid rate, a chamber in said unit casing section, a charging valve past which fluid under pressure being supplied to the receiving device flows to charge said chamber, means adapted to condition said charging valve to limit the pressure established in said chamber to any one of a plurality of a different values lower than that established in the receiving device, and means in the unit casing section adapted to be subject in opposing relation to pressure in said chamber and the pressure of fluid resupplied to the receiving device following a reduction of the pressure therein by operation of said valve mechanism and responsive to the establishment of a pressure in the receiving device corresponding substantially to that existing in said chamber for causing said valve means to be operated to terminate the flow of fluid under pressure therepast to the receiving device.

GEORGE K. NEWELL.

REFERENCES CITED

The following references are of record in the file of this patent:

UNITED STATES PATENTS

| Number | Name | Date |
| --- | --- | --- |
| 2,125,094 | Work et al. | July 26, 1938 |
| 2,258,761 | Hewitt | Oct. 14, 1941 |
| 2,198,030 | Farmer | Apr. 23, 1940 |
| 2,208,737 | Stewart | July 23, 1940 |